United States Patent
Kasatani

(10) Patent No.: US 7,573,615 B2
(45) Date of Patent: Aug. 11, 2009

(54) MULTI-FUNCTION IMAGE FORMING APPARATUS WITH IMPROVED SCAN-TO-EMAIL FUNCTION

(75) Inventor: Kiyoshi Kasatani, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 910 days.

(21) Appl. No.: 11/065,044

(22) Filed: Feb. 25, 2005

(65) Prior Publication Data

US 2005/0195446 A1    Sep. 8, 2005

(30) Foreign Application Priority Data

Feb. 25, 2004    (JP) .............................. 2004-049178

(51) Int. Cl.
*H04N 1/00* (2006.01)
*H04N 1/04* (2006.01)

(52) U.S. Cl. .................. 358/402; 358/474; 382/101; 382/229

(58) Field of Classification Search .............. 358/1.13, 358/402, 505, 474; 382/101, 229
See application file for complete search history.

(56) References Cited

U.S. PATENT DOCUMENTS

| | | | | |
|---|---|---|---|---|
| 5,974,370 | A * | 10/1999 | Suda et al. | 704/2 |
| 6,831,758 | B1 | 12/2004 | Toda | |
| 7,079,275 | B2 * | 7/2006 | Henry et al. | 358/1.15 |
| 7,092,994 | B2 * | 8/2006 | Nishio et al. | 709/206 |
| 7,295,337 | B2 * | 11/2007 | Eguchi et al. | 358/1.15 |
| 2004/0010757 | A1 * | 1/2004 | McCoy et al. | 715/530 |
| 2004/0190772 | A1 * | 9/2004 | Constantin et al. | 382/175 |

FOREIGN PATENT DOCUMENTS

| | | | |
|---|---|---|---|
| JP | 05075765 | A * | 3/1993 |
| JP | 10-13592 | | 1/1998 |
| JP | 11-88633 | | 3/1999 |
| JP | 2000-216944 | | 8/2000 |
| JP | 2000-341502 | | 12/2000 |
| JP | 2002-218138 | | 8/2002 |
| JP | 2002-335367 | | 11/2002 |
| JP | 2003-51850 | | 2/2003 |

* cited by examiner

*Primary Examiner*—Mark K Zimmerman
*Assistant Examiner*—Huo Long Chen
(74) *Attorney, Agent, or Firm*—Oblon, Spivak, McClelland, Maier & Neustadt, P.C.

(57) ABSTRACT

In a multi-function image forming apparatus connected with a network, an email transmission device extracts image data of an address area, a subject area, and a body area of an original document from image data of the original document according to a designated one of a plurality of pieces of OCR area information stored in an OCR area information storage device, performs character recognition relative to the extracted image data of an address area, a subject area, and a body area of the original document with an OCR device to obtain character strings of the address area, the subject area, and the body area of the original document, sets the obtained character strings of the address area, the subject area, and the body area of the original document as an address, a subject, and a body of an email, and transmits the email while attaching the image data of the original document to the body of the email.

3 Claims, 30 Drawing Sheets

(INDIVIDUAL SETTING INFORMATION)

(INDIVIDUAL INFORMATION)

FIG. 8A

| MAIL ADDRESS (100 PIECES) |
| --- |
| FACSIMILE ADDRESS (100 PIECES) |
| GROUP ADDRESS (100 PIECES) |
| FILE ADDRESS (100 PIECES) |
| SUBJECT/BODY (100 PIECES) |
| DOCUMENT NAME/ USER NAME (100 PIECES) |

(REGISTRATION INFORMATION)

FIG. 8B

| NAME |
| --- |
| MAIL ADDRESS |
| POSITION |
| TRANSMISSION OPTION DESIGNATION |
| INTERNET FACSIMILE TRANSMISSION |
| SMTP SERVER DESIGNATED TRANSMISSION |
| SMTP SERVER ADDRESS |
| MAIL TRANSMISSION AUTHENTICATION |
| AUTHENTICATION METHOD |
| AUTHENTICATION POP SERVER ADDRESS |
| AUTHENTICATION USER NAME |
| AUTHENTICATION PASSWORD |
| OCR ADDRESS DESIGNATION |

(EACH MAIL ADDRESS)

FIG. 8C

| NAME |
| --- |
| FACSIMILE NUMBER |
| POSITION |
| TRANSMISSION OPTION DESIGNATION |
| TRANSMISSION PORT NAME |
| OCR ADDRESS DESIGNATION |

(EACH FACSIMILE ADDRESS)

FIG. 8D

| NAME |
| --- |
| MAIL ADDRESS |

(EACH GROUP ADDRESS)

FIG. 8E

| NAME |
| --- |
| NETWORK PATH |
| LOG-IN USER NAME |
| LOG-IN PASSWORD |
| SUB-FOLDER NAME SELECTION |
| COMMUNICATION OPTION DESIGNATION |
| FTP JAPANESE MODE |
| FTP DATA TRANSFER MODE |
| OCR ADDRESS DESIGNATION |

(EACH FILE ADDRESS)

FIG. 9A

| TYPE OF SERVER | NETWORK PATH |
|---|---|
| WINDOWS FILE SERVER | "¥¥<HOST>¥<PATH>" OR "FILE://[<USER>:<PASSWORD>@]<HOST>/<PATH>" |
| FTP SERVER | "FTP://[<USER>:<PASSWORD>@]<HOST>[:<PORT>]/<PATH>" |
| WEBDAV SERVER | "HTTP(S)://[<USER>:<PASSWORD>@]<HOST>[:<PORT>]/<PATH>" |
| EXTERNAL DOCUMENT MANAGEMENT SERVER | DEPENDS ON THE SPECIFICATION OF EXTERNAL SERVER PLUG-IN |

( NETWORK PATH OF FILE ADDRESS )

FIG. 9B

| TYPE OF LOCAL MEDIA | ABBREVIATION | LOCAL PATH |
|---|---|---|
| COMPACTFLASH | CF | "FILE:///CF:<PATH>" |
| SMARTMEDIA | SM | "FILE:///SM:<PATH>" |
| SD MEMORY CARD | SD | "FILE:///SD:<PATH>" |
| MEMORY STICK | MS | "FILE:///MS:<PATH>" |
| DVD/CD-ROM (OPTION) | CD | "FILE:///CD:<PATH>" |

( LOCAL PATH OF FILE ADDRESS )

FIG. 9C

| SUBJECT |
|---|
| BODY |

( EACH SUBJECT/BODY )

FIG. 9D

| DOCUMENT NAME |
|---|
| OCR |
| USER NAME |

( EACH DOCUMENT NAME/USER NAME )

FIG. 10A

| READ CONDITION (12 PIECES) |
|---|
| IMAGE PROCESS CONDITION (12 PIECES) |
| TRANSMISSION/ STORAGE CONDITION ONE TOUCH (20 PIECES) |
| PRINT CONDITION ONE TOUCH (20 PIECES) |
| RECEIVED MAILBOX (12 PIECES) |
| SHARED MEDIA ADDRESS (12 PIECES) |
| FILE TRANSMISSION LINK ADDRESS (12 PIECES) |

(PRESET INFORMATION)

FIG. 10B

| NAME |
|---|
| ICON |
| DISPLAY/NON-DISPLAY |
| ORIGINAL DOCUMENT TYPE |
| IMAGE QUALITY |
| RESOLUTION |
| READ DENSITY |
| READ SIZE |
| REGULAR SIZE |
| IRREGULAR SIZE |
| FRAME DELETION |
| BOTH-SIDE READ |

(READ CONDITION)

FIG. 11A

| NAME |
|---|
| ICON |
| DISPLAY/NON-DISPLAY |
| IMAGE QUALITY CORRECTION |
| PAGE NUMBER DESIGNATION |
| AUTOMATIC IMAGE QUALITY CORRECTION |
| BRIGHTNESS |
| CONTRAST |
| CLEARNESS |
| COLOR |
| ROTATION |
| PAGE NUMBER DESIGNATION |
| ROTATION DIRECTION |
| COLOR SUBTRACTION/ CONVERSION TO BLACK-AND-WHITE |
| PAGE NUMBER DESIGNATION |
| THE NUMBER OF COLORS |
| DROPOUT COLOR |
| CHARACTER AREA COLOR SUBTRACTION |
| NON-CHARACTER AREA RESOLUTION |

( IMAGE PROCESS CONDITION; TO BE CONTINUED )

FIG. 11B

| CUTOUT |
|---|
| PAGE NUMBER DESIGNATION |
| CUTOUT AREA |
| ORIGINAL IMAGE |
| ORIGINAL IMAGE RESOLUTION |
| BLANK DELETION |
| PAGE NUMBER DESIGNATION |

( IMAGE PROCESS CONDITION; CONTINUED )

FIG. 12A

| NAME |
|---|
| CHARACTER SIZE |
| ICON |
| DISPLAY/NON-DISPLAY |
| ADDRESS |
| SUBJECT |
| BODY |
| STORAGE |
| DOCUMENT NAME |
| USER NAME |
| PASSWORD |
| SPLIT STORAGE |
| THUMBNAIL DESIGNATION |
| ADDRESS |
| DOCUMENT NAME |
| TRANSMISSION OPTION DESIGNATION |
| FILE FORMAT |
| LINK TRANSMISSION |
| LINK FORMAT |
| THUMBNAIL TRANSMISSION |
| FILE COMPRESSION |

- ADDRESS, SUBJECT, BODY: MAIL TRANSMISSION RELATED
- STORAGE, DOCUMENT NAME, USER NAME, PASSWORD: DOCUMENT STORAGE RELATED
- SPLIT STORAGE, THUMBNAIL DESIGNATION: STORAGE OPTION
- ADDRESS, DOCUMENT NAME: DOCUMENT TRANSMISSION RELATED (TRANSMISSION/STORAGE CONDITION ONE-TOUCH;TO BE CONTINUED)

FIG. 12B

| READ CONDITION |
|---|
| IMAGE PROCESS CONDITION |
| TRANSMISSION/STORAGE FORM DESIGNATION |
| FILE NAME |
| FILE DATE |
| INDIVIDUAL NAME |

(TRANSMISSION/STORAGE CONDITION ONE-TOUCH;CONTINUED)

FIG. 13

| NAME |
|---|
| CHARACTER SIZE |
| ICON |
| DISPLAY/NON-DISPLAY |
| PRINT FORMAT |
| COLOR FORMAT |
| IMAGE QUALITY FIRST/ SPEED FIRST |
| BOTH-SIDE PRINT |
| SORT/STACK |
| PUNCH |
| STAPLE |
| SHEET SELECTION |
| SHEET TYPE |
| IMAGE PROCESS CONDITION |
| PRINT FORM DESIGNATION |
| FILE NAME |
| FILE DATE |
| INDIVIDUAL NAME |

( PRINT CONDITION ONE-TOUCH )

FIG. 14A

| NAME |
|---|
| ICON |
| ACCOUNT NAME |
| TRANSMISSION/STORAGE |
| FACSIMILE TRANSMISSION |
| PRINT |
| COVERING LETTER FORM DESIGNATION |
| RESULT MAIL RETURN |
| RECEIVED FACSIMILE TRANSFER DESTINATION SETTING |

( RECEIVED MAILBOX )

FIG. 14B

[ 01 ]: ERROR MAIL
[ 02 ]: FACSIMILE MAIL
[ 03 ]: PRINT MAIL
[ 04 ]: STORAGE MAIL
[ 05-12 ]: ( BLANK )

( INITIAL SETTING VALUES OF NAME )

FIG. 14C

[ 01 ]: SENDER
[ 02 ]: FACSIMILE
[ 03 ]: PRINT
[ 04 ]: STORAGE
[ 05-12 ]: ( BLANK )

( INITIAL SETTING VALUES OF ACCOUNT NAME )

FIG. 14D

| NAME |
|---|
| ICON |
| DISPLAY/NON-DISPLAY |
| SHARED MEDIA ADDRESS |
| FILE ARRANGEMENT ORDER |

( SHARED MEDIA ADDRESS )

FIG. 14E

| NAME |
|---|
| ICON |
| DISPLAY/NON-DISPLAY |
| FILE TRANSMISSION DESTINATION |
| TRANSMISSION LINK ADDRESS |
| AUTOMATIC DELETION SETTING |

( FILE TRANSMISSION LINK ADDRESS )

FIG. 15A

| BASIC SETTING |
|---|
| DISPLAY SETTING |
| READ SETTING |
| COMMUNICATION SETTING |
| STORAGE SETTING |
| PRINT SETTING |
| OCR SETTING |

( INDIVIDUAL SYSTEM SETTING INFORMATION )

FIG. 15B

| INDIVIDUAL MENU AUTOMATIC TERMINATION ( INDIVIDUAL ONLY ) |
|---|
| AUTOMATIC CLEAR TIME SETTING ( GUEST ONLY ) |
| RETURN TO MAIN SCREEN AFTER OPERATION COMPLETION |
| KEY INPUT/SCREEN TOUCH SOUND SETTING |
| MAIL SUBJECT AUTOMATIC INPUT |
| MAIL BODY AUTOMATIC INPUT |
| TEXT FILE FORMAT |
| COMPRESSION SETTING IN CONVERSION TO TIFF IMAGE |
| IMAGE QUALITY SETTING IN CONVERSION TO JPEG IMAGE |
| MAXIMUM NUMBER OF COLORS IN CONVERSION TO PNG IMAGE |

( BASIC SETTING )

(DISPLAY SETTING)

(READ SETTING)

(COMMUNICATION SETTING)

(STORAGE SETTING)

FIG. 18A

| PRIORITY PRINT FORMAT |
| --- |
| PRIORITY PRINT COLOR |
| PRIORITY SHEET FEED TRAY |
| SHEET SIZE |
| SHEET TYPE |
| PRIORITY PRINT FORM |
| FILE NAME |
| FILE DATE |
| INDIVIDUAL NAME |
| BRIGHTNESS |
| CONTRAST |
| CLEARNESS |
| RED BALANCE |
| GREEN BALANCE |
| BLUE BALANCE |

INDIVIDUAL NAME through GREEN BALANCE } COLOR PRINT ADJUSTMENT ( PRINT SETTING )

FIG. 18B

| OCR DIRECTION |
| --- |
| OCR LANGUAGE |
| OCR ORIGINAL DOCUMENT |
| OCR MAX CHARACTER SIZE |

(OCR SETTING)

FIG. 19A

| NETWORK ACCESS RESTRICTION |
|---|
| MAIL TRANSMISSION AUTHENTICATION |
| ACCESS RIGHT SETTING |

( SECURITY INFORMATION )

FIG. 19B

| HTTP ACCESS RESTRICTION ( 20PIECES ) |
|---|
| SMTP/POP ACCESS RESTRICTION ( 20 PIECES ) |

( NETWORK ACCESS RESTRICTION )

FIG. 19C

| MAIL TRANSMISSION AUTHENTICATION |
|---|
| AUTHENTICATION METHOD |
| AUTHENTICATION POP SERVER ADDRESS |
| AUTHENTICATION USER NAME |
| AUTHENTICATION PASSWORD |

( MAIL TRANSMISSION AUTHENTICATION )

FIG. 19D

| AUTHORITY CLASS |
|---|
| FUNCTION RESTRICTION |
| COPY |
| DOCUMENT BOX |
| FACSIMILE |
| PRINTER |
| SCANNER |
| MAIL TRANSMISSION |
| DOCUMENT STORAGE |
| INDIVIDUAL CAPACITY DESIGNATION |
| STORAGE DOCUMENT PASSWORD AUTOMATIC INPUT |
| AUTOMATIC DELETION SETTING |
| GENERAL DOCUMENT |
| RECEIVED MAIL |
| PRE-TRANSMISSION TRAY |
| FILE TRANSMISSION |
| FULL COLOR PRINT |
| ADMINISTRATOR USER CODE |

( ACCESS RIGHT SETTING )

FIG. 20A

| NETWORK SETTING |
|---|
| MAIL SETTING |
| FACSIMILE SETTING |
| FILE TRANSMISSION AND RECEPTION SETTING |
| SYSTEM MANAGEMENT |

( SYSTEM SETTING INFORMATION )

FIG. 20B

| HOST NAME |
|---|
| DOMAIN NAME |
| IP ADDRESS |
| SUB-NETWORK MASK |
| GATEWAY ADDRESS |
| DNS SERVER ADDRESS 1 |
| DNS SERVER ADDRESS 2 |
| PROXY SERVER SETTING |
| PROXY SERVER ADDRESS |
| PROXY SERVER PORT NUMBER |
| PROXY UNUSED ADDRESS |
| USER NAME |
| PASSWORD |
| SSL ENCRYPTION |
| ISO COUNTRY CODE |
| PREFECTURE NAME |
| MUNICIPALITY |

( NETWORK SETTING; TO BE CONTINUED )

FIG. 20C

| COMPANY NAME/ ORGANIZATION NAME |
|---|
| DIVISION NAME/ ORGANIZATION NAME, POSITION |
| SERVER NAME |
| ADMINISTRATOR MAIL ADDRESS |
| EXPIRATION DATE |
| PORT NUMBER SETTING |
| SMTP TRANSMISSION |
| SMTP RECEPTION |
| POP |
| FTP |
| HTTP |
| HTTPS |
| LDAP |
| PRINTER IP ADDRESS |
| LAN SPEED |
| PHYSICAL ADDRESS ( MAC ) |

( NETWORK SETTING;CONTINUED )

FIG. 21A

| SMTP SERVER IP ADDRESS |
| --- |
| MAIL RECEPTION PROTOCOL |
| POP MAIL ADDRESS |
| POP SERVER ADDRESS |
| POP ACCOUNT NAME |
| POP PASSWORD |
| POP MAIL RECEPTION INTERVAL |
| POP MAIL RULE TRANSFER DESTINATION |
| USE OF PUBLIC ADDRESS BOOK |
| LDAP SERVER ADDRESS 1 |
| IDENTIFICATION NAME |
| LDAP SERVER ADDRESS 2 |
| IDENTIFICATION NAME |
| PUBLIC ADDRESS BOOK AUTOMATIC UPDATING |
| MAIL TRANSMISSION AUTHENTICATION |
| AUTHENTICATION METHOD |
| AUTHENTICATION POP SERVER ADDRESS |
| AUTHENTICATION USER NAME |
| AUTHENTICATION PASSWORD |

( MAIL SETTING; TO BE CONTINUED )

FIG. 21B

| TRANSMISSION SIZE RESTRICTION |
| --- |
| MAX SIZE |
| MAIL SPLIT |
| TRANSMISSION INTERVAL |
| RETRANSMISSION INTERVAL |
| THE NUMBER OF RETRANSMISSION TIMES |

( MAIL SETTING; CONTINUED )

(FACSIMILE SETTING)

(FILE TRANSMISSION AND RECEPTION SETTING)

FIG. 23A

| STORAGE DOCUMENT |
| HISTORY MANAGEMENT |
| SECURITY |
| DATE/TIME SETTING |

( SYSTEM MANAGEMENT )

FIG. 23B

| GENERAL DOCUMENT |
| RECEIVED MAIL |
| RECEIVED FACSIMILE |
| PRE-TRANSMISSION TRAY |
| AUTOMATIC DELETION TIME |
| INDIVIDUAL CAPACITY RESTRICTION |

} AUTOMATIC DELETION SETTING (for the first four rows)

( STORAGE DOCUMENT )

FIG. 23C

| AUTOMATIC HISTORY DELETION |
| HISTORY STORAGE PERIOD |
| AUTOMATIC MANAGEMENT REPORT PRINT |

( HISTORY MANAGEMENT )

FIG. 23E

| DATE SETTING |
| TIME SETTING |

( DATE/TIME SETTING )

FIG. 23D

| ADMINISTRATOR SETTING PASSWORD |
| AUTOMATIC REACTIVATION |
| GUEST MENU PROHIBITION |
| NEW INDIVIDUAL REGISTRATION PROHIBITION |
| ADDRESS DIRECT INPUT PROHIBITION |
| GENERAL DOCUMENT |
| RECEIVED MAIL |
| RECEIVED FACSIMILE |
| PRE-TRANSMISSION TRAY |
| HTTP ACCESS RESTRICTION |
| SMTP/POP ACCESS RESTRICTION |

GUEST MENU RESTRICTION (GUEST MENU PROHIBITION through ADDRESS DIRECT INPUT PROHIBITION)

STORAGE DOCUMENT PASSWORD PROTECTION (GENERAL DOCUMENT through PRE-TRANSMISSION TRAY)

NETWORK ACCESS RESTRICTION (HTTP ACCESS RESTRICTION, SMTP/POP ACCESS RESTRICTION)

( SECURITY )

( CONFIDENTIAL LINK INFORMATION TABLE )

( CONFIDENTIAL LINK INFORMATION )

(BUSINESS DOCUMENT CONTENT ARRANGEMENT EXAMPLE)

(OCR AREA INFORMATION TABLE)

(OCR AREA INFORMATION)

(AREA INFORMATION)

MULTI-FUNCTION IMAGE FORMING APPARATUS WITH IMPROVED SCAN-TO-EMAIL FUNCTION

CROSS-REFERENCE TO RELATED APPLICATIONS

The present patent document claims priority and contains subject matter related to Japanese Patent Application No. 2004-049178 filed in the Japanese Patent Office on Feb. 25, 2004 and the entire contents of which are hereby incorporated herein by reference.

BACKGROUND OF THE INVENTION

1. Field of the Invention

The present invention relates to a multi-function image forming apparatus connected with a network and capable of transmitting and receiving a variety of data to and from network terminal apparatuses using a plurality of communication protocols.

2. Discussion of the Background Art

Recently, a network communication system including a so-called multi-function image forming apparatus has been developed. The multi-function image forming apparatus is capable of communicating with terminal apparatuses in the system using a variety of communication protocols.

A wide variety of application services are provided in such a multi-function image forming apparatus connected with the network communication system. For example, a so-called scan-to-email service provides a service to scan an original document with an image read device of the multi-function image forming apparatus and to transmit image data of the original document to a designated mail address using email. An email print service provides a service to print out body information of a received email and an image of an attached file of the received email. A facsimile transfer service provides a service to transfer body information of a received email and an image of an attached file of the received email to a designated facsimile apparatus.

In such a multi-function image forming apparatus, however, when transmitting image data of an original document, that has been obtained by scanning the original document, with email using the above-described scan-to-email service, an address, a subject, and the body of an email must be manually input by the user, which is troublesome.

SUMMARY OF THE INVENTION

The present invention has been made in views of the above-discussed and other problems and addresses the above-discussed and other problems.

Preferred embodiments of the present invention provide a novel multi-function image forming apparatus that enhances usability of a scan-to-email function, etc. and a novel scan-to-email method of transmitting image data of an original document with email in a multi-function image forming apparatus connected with a network.

According to an embodiment of the present invention, a multi-function image forming apparatus connected with a network includes an image read device configured to read an image of an original document to obtain image data of the original document, an OCR device configured to recognize characters included in the original document based on the obtained image data of the original document, and an OCR area information storage device configured to store a plurality of pieces of OCR area information defining OCR areas of original documents of different types, each OCR area information including address area information defining an address area where an address is described, subject area information defining a subject area where a subject is described, and body area information defining a body area where a body is described. An email transmission device extracts image data of an address area, a subject area, and a body area of the original document from the image data of the original document according to a designated one of the plurality of pieces of OCR area information stored in the OCR area information storage device, performs character recognition relative to the extracted image data of an address area, a subject area, and a body area of the original document with the OCR device to obtain character strings of the address area, the subject area, and the body area of the original document, sets the obtained character strings of the address area, the subject area, and the body area of the original document as an address, a subject, and a body of an email, and transmits the email while attaching the image data of the original document to the body of the email.

The multi-function image forming apparatus may further include a substitution character string registration device configured to register substitute character strings used for addresses, subjects, and/or bodies of emails when character strings of the address area, the subject area, and/or the body area of the original document cannot be obtained by performing character recognition relative to the extracted image data of the address area, the subject area, and the body area of the original document with the OCR device.

According to another embodiment of the present invention, a scan-to-email method of transmitting image data of an original document with email in a multi-function image forming apparatus connected with a network is provided. The scan-to-email method includes: storing a plurality of pieces of OCR area information defining OCR areas of original documents of different types, each OCR area information including address area information defining an address area where an address is described, subject area information defining a subject area where a subject is described, and body area information defining a body area where a body is described; inputting address information of an email or designating OCR inputting of address information of the email while designating one of the plurality of pieces of OCR area information; inputting subject information of the email or designating OCR inputting of subject information of the email while designating the one of the plurality of pieces of OCR area information; inputting body information of the email or designating OCR inputting of body information of the email while designating the one of the plurality of pieces of OCR area information; reading an image of the original document with an image read device of the multi-function image forming apparatus to obtain the image data of the original document; determining if OCR inputting of address information of the email has been designated, and when it is determined that OCR inputting of address information of the email has been designated, extracting image data of an address area of the original document from the image data of the original document according to the designated one of the plurality of pieces of OCR area information, performing character recognition to the extracted image data of an address area of the original document to obtain a character string of the address area of the original document, and setting the obtained character string as address information of the email; determining if OCR inputting of subject information of the email has been designated, and when it is determined that OCR inputting of subject information of the email has been designated, extracting image data of a subject area of the original document from the image data of the original document according to the designated one of the plurality of pieces of OCR area information, performing character recognition to the extracted image data of a subject area of the original document to obtain a character string of the subject area of the original document, and setting the obtained character string as subject information of the email; determining if OCR inputting of body information of the email has been designated, and when it is determined that OCR inputting of body information of the email has been designated, extracting image data of a body area of the original document from the image data of the original document according to the designated one of the plurality of pieces of OCR area information, performing character recognition to the extracted image data of a body area of the original document to obtain a character string of the body area of the original document, and setting the obtained character string as body information of the email; generating header information of the email using, when OCR inputting of address information and/or subject information of the email has not been designated, the address information and/or the subject information input in the input inputting address information of the email and/or in the inputting of inputting subject information of the email, and when OCR inputting of address information and/or subject information of the email has been designated, the address information and/or the subject information set in the determining if OCR inputting of address information of the email has been designated and/or in the determining if OCR inputting of subject information of the email has been designated, and embedding the image data of the original document as a file attached to the email, when OCR inputting of body information of the email has not been designated, in the body information inputted in the inputting body information of the email, and when OCR inputting of body information of the email has been designated, in the body information set in the determining if OCR inputting of body information of the email has been designated; and transmitting the email.

The scan-to-email method may further include registering address information, subject information, and body information to each of the plurality pieces of OCR area information. In this case, in the determining if OCR inputting of address information of the email has been designated, when it is determined that OCR inputting of address information of the email has been designated, whether or not the number of characters in the obtained character string of the address area of the original document is equal to or greater than a first predetermined number is determined, and when the number of characters in the obtained character string of the address area of the original document is equal to or greater than the first predetermined number, the obtained character string of the address area of the original document is set as the address information of the email, and when the number of characters in the obtained character string of the address area of the original document is not equal to or greater than the first predetermined number, the address information registered to the designated one of the plurality of pieces of OCR area information is set as the address information of the email. Further, in the determining if OCR inputting of subject information of the email has been designated, when it is determined that OCR inputting of subject information of the email has been designated, whether or not the number of characters in the obtained character string of the subject area of the original document is equal to or greater than a second predetermined number is determined, and when the number of characters in the obtained character string of the subject area of the original document is equal to or greater than the second predetermined number, the obtained character string of the subject area of the original document is set as the subject information of the email, and when the number of characters in the obtained character string of the subject area of the original document is not equal to or greater than the second predetermined number, the subject information registered to the designated one of the plurality of pieces of OCR area information is set as the subject information of the email. Furthermore, in the determining if OCR inputting of body information of the email has been designated, when it is determined that OCR inputting of body information of the email has been designated, whether or not the number of characters in the obtained character string of the body area of the original document is equal to or greater than a third predetermined number is determined, and when the number of characters in the obtained character string of the body area of the original document is equal to or greater than the third predetermined number, the obtained character string of the body area of the original document is set as the body information of the email, and when the number of characters in the obtained character string of the body area of the original document is not equal to or greater than the third predetermined number, the body information registered to the designated one of the plurality of pieces of OCR area information is set as the body information of the email.

The scan-to-email method may further include registering mail addresses, file addresses, and group addresses for each user. In this case, in the determining if OCR inputting of address information of the email has been designated, when it is determined that OCR inputting of address information has been designated, the registered mail addresses, file addresses, and group addresses are retrieved using the obtained character string of the address area of the original document for a keyword to obtain mail addresses, file addresses, and group addresses agreeing with the obtained character string, each overlapped address in the obtained mail addresses, file addresses, and file addresses is deleted, and the obtained mail addresses, file addresses, and group addresses after deleting each overlapped address is set as the address information of the email.

BRIEF DESCRIPTION OF THE DRAWINGS

A more complete appreciation of the present invention and many of the attendant advantages thereof will be readily obtained as the same becomes better understood with reference to the following detailed description when considered in connection with the accompanying drawings, wherein:

FIG. 8A is a diagram illustrating an example of registration information;

FIG. 8B is a diagram illustrating an example of a mail address;

FIG. 8C is a diagram illustrating an example of a facsimile address;

FIG. 8D is a diagram illustrating an example of a group address;

FIG. 8E is a diagram illustrating an example of a file address;

FIG. 9A is a diagram illustrating an example of a network path of a file address;

FIG. 9B is a diagram illustrating an example of a local path of a file address;

FIG. 9C is a diagram illustrating an example of a subject/body;

FIG. 9D is a diagram illustrating an example of a document name/user name;

FIG. 10A is a diagram illustrating an example of preset information;

FIG. 10B is a diagram illustrating an example of a read condition;

FIG. 11A is a diagram illustrating a portion of an image process condition;

FIG. 11B is a diagram illustrating another portion of the image process condition;

FIG. 12A is a diagram illustrating a portion of an example of a transmission/storage condition one-touch;

FIG. 12B is a diagram illustrating another portion of the example of the transmission/storage condition one-touch;

FIG. 13 is a diagram illustrating an example of a print condition one-touch;

FIG. 14A is a diagram illustrating an example of a received mailbox;

FIG. 14B is a diagram illustrating an example of an initial setting value of a name;

FIG. 14C is a diagram illustrating an example of an initial setting value of an account name;

FIG. 14D is a diagram illustrating an example of a shared media address;

FIG. 14E is a diagram illustrating an example of a file transmission link address;

FIG. 15A is a diagram illustrating an example of individual system setting information;

FIG. 15B is a diagram illustrating an example of a basic setting;

FIG. 18A is a diagram illustrating an example of a print setting;

FIG. 18B is a diagram illustrating an example of an OCR setting;

FIG. 19A is a diagram illustrating an example of a security;

FIG. 19B is a diagram illustrating an example of a network access restriction;

FIG. 19C is a diagram illustrating an example of a mail transmission authentication;

FIG. 19D is a diagram illustrating an example of an access right setting;

FIG. 20A is a diagram illustrating an example of system setting information;

FIG. 20B is a diagram illustrating a portion of an example of a network setting;

FIG. 20C is a diagram illustrating another portion of the example of a network setting;

FIG. 21A is a diagram illustrating a portion of an example of a mail setting;

FIG. 21B is a diagram illustrating another portion of the example of a mail setting;

FIG. 23A is a diagram illustrating an example of system management;

FIG. 23B is a diagram illustrating an example of a storage document;

FIG. 23C is a diagram illustrating an example of history management;

FIG. 23D is a diagram illustrating an example of a security;

FIG. 23E is a diagram illustrating an example of a date/time setting;

DETAILED DESCRIPTION OF THE PREFERRED EMBODIMENTS

Figure 1:
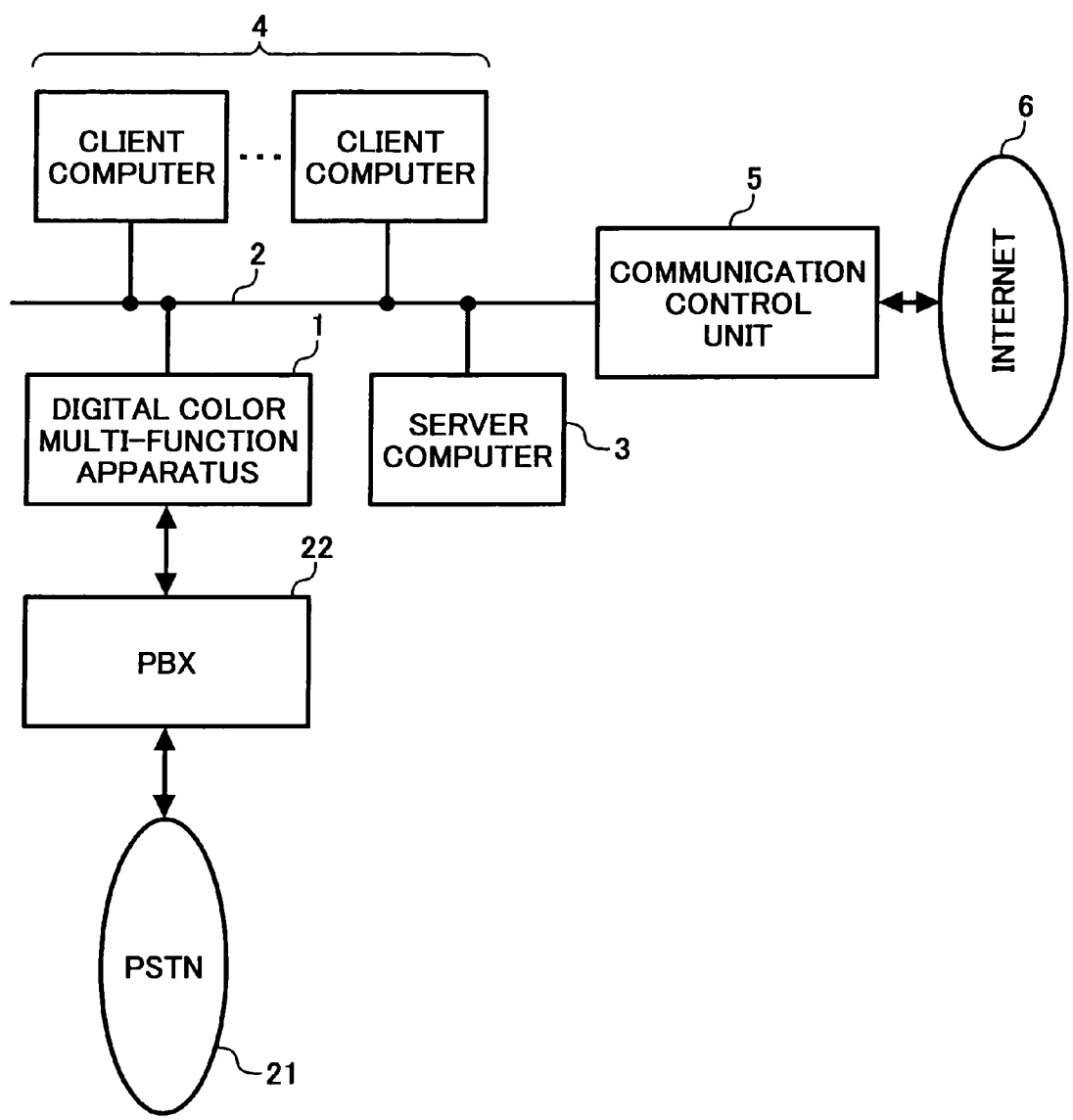
FIG. 1 is a diagram schematically illustrating a construction of a network communication system including a digital color multi-function apparatus according to an embodiment of the present invention.

Referring now to the drawings, wherein like reference numerals designate identical or corresponding parts throughout the several views.

In the following description, words, idioms, or abbreviations representing product names or specific image formats are included. Some of them are registered trademarks or trademarks of respective manufactures, organizations or individuals; however, annotation thereof might be omitted in cases in which they are generally or commonly used in technical fields to which the present invention is applied.

The description of the preferred embodiments is made taking as an example a digital color multi-function image forming apparatus in which a copier function, a facsimile function, a print function, a scanner function, an image storage function, an image distribution function, etc., are integrated.

FIG. 1 schematically illustrates a construction of a network communication system including a digital color multi-function apparatus 1 according to an embodiment of the present invention.

As illustrated in FIG. 1, the digital color multi-function apparatus 1 is connected with a server computer 3 and a plurality of client computers 4 via a local area network (LAN) 2 as an example of a communication network. The server computer 3 and the plurality of client computers 4 perform various types of information processing, respectively. The server computer 3 supports, for example, FTP (file transfer protocol) and HTTP (hyper text transfer protocol), and realizes functions of a Web server and a DNS (domain name service) server.

That is, a network environment is realized in the network communication system such that image process functions of the digital color multi-function apparatus 1, such as, the scanner function (an image input function), the print function (an image output function), image storage function, etc., are shared on the local area network 2.

The communication network system is connected with the Internet 6 via a communication control unit 5 to communicate with the outer environment.

The communication control unit 5 may be realized with a router, a switching apparatus, a modem, or a DSL modem, that is at least capable of TCP/IP (transmission control/Internet protocol) communication. The local area network 2 may be a wired network using, for example, optical fiber cables, or a wireless network using, for example, infrared rays, radio waves, etc.

Figure 2:
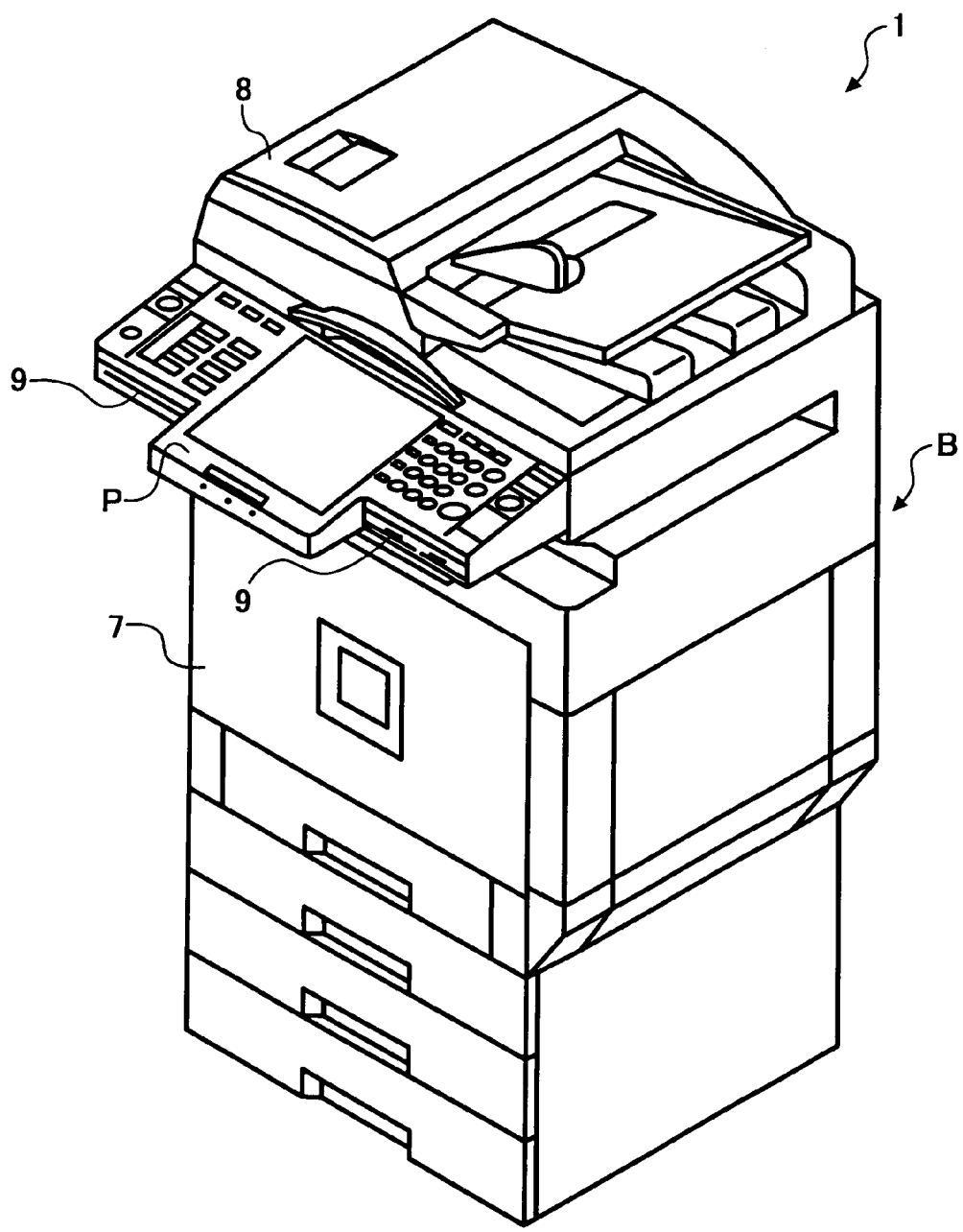
FIG. 2 is a schematic perspective view of the digital color multi-function apparatus.
Figure 3:
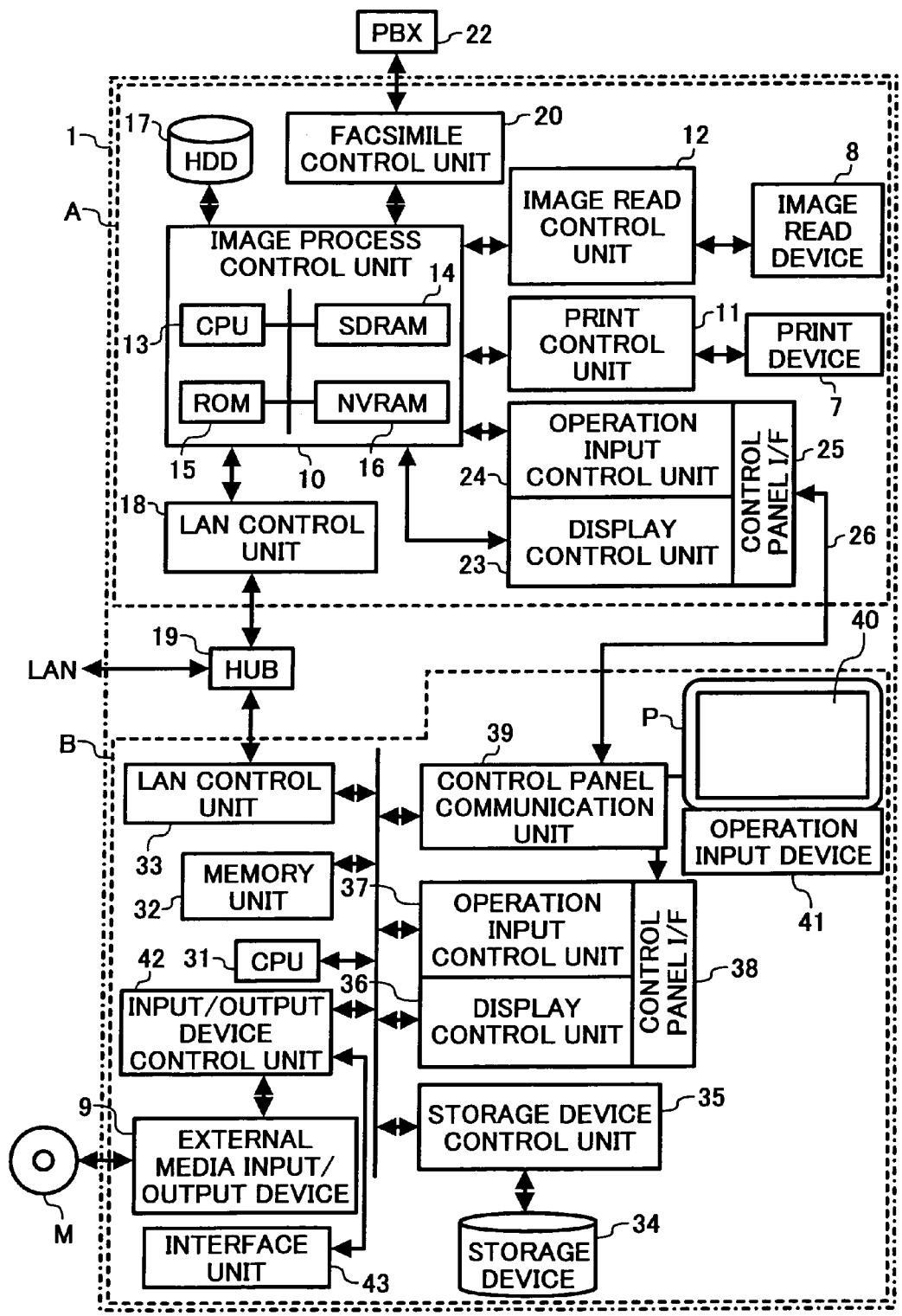
FIG. 3 is a block diagram illustrating electrical connections of respective parts of the digital color multi-function apparatus.

FIG. 2 is a schematic perspective view of the digital color multi-function apparatus 1. FIG. 3 is a block diagram illustrating electrical connections of respective parts of the digital color multi-function apparatus 1.

As illustrated in FIG. 2, in the digital color multi-function apparatus 1, an image read device 8 configured to read an image of an original document is arranged on a print device 7 configured to form an image on a medium such as a transfer sheet.

An operation panel P configured to display messages for the operator and to allow various inputting by the operator, such as setting of a function, etc., is provided on an outer surface of the image read device 8.

Further, an external media input/output device 9 is provided on a lower part of the operation panel P with an insertion opening thereof exposed to allow insertion of a storage medium M, such as an optical disk, a flexible disk, etc. The external media input/output device 9 is configured to read program codes, image data, etc., stored in the storage medium M, and to write program codes, image data, etc. to the storage medium M.

The digital color multi-function apparatus 1 includes, as illustrated in FIG. 3, an image process unit A and an information process unit B. The image process unit A includes the print device 7 and the image read device 8, and the information process unit B includes the operation panel P and the external media input/output device 9.

First, the image process unit A is described.

The image process unit A includes an image process control unit 10 configured to control overall image processing at the image process unit A. The image process unit A is connected with a print control unit 11 configured to control the print device 7 and an image read control unit 12 configured to control the image read unit 8.

The print control unit 11 outputs a print instruction including image data to the print device 7 and causes the print device 7 to form an image on a medium such as a transfer sheet according to control of the image process control unit 10. The print device 7 is capable of forming a full color image on the medium. The print device 7 may use any of electrophotography, ink jet printing, sublimation type thermal transfer printing, silver film photography, direct thermal recording, fusion type thermal transfer printing, etc.

The image read control unit 12 drives the image read device 8 according to control of the image process control unit 10. A reflected light from a surface of an original document is condensed onto a light receive element, such as a CCD (charge coupled device), and thereby image data of an image of the original document is obtained. The image data is then converted, by performing analog to digital conversion thereto, to digital image data of R (red), G (green), and B (blue), each in 8 bits.

The image process unit 10 includes a CPU (central processing unit) 13 serving as a main processor, a SDRAM (synchronous dynamic random access memory) 14 for temporarily storing image data obtained by the image read device 8, a ROM (read only memory) 15 storing a control program, etc., and a NVRAM (non-volatile random access memory) 16 capable of holding data even when the power has been turned off and storing system setting information, system logging information, etc. The CPU 13, the SDRAM 14, the ROM 15, and the NVRAM are connected with each other by a bus.

The image process unit 10 is connected with a HDD (hard disk drive) 17 serving as a storage device for storing a large volume of image data, job history, etc., a LAN (local area network) control unit 18 connecting the image process unit A with the LAN 2 via a HUB 19 serving as a line concentrator of an internal LAN, and a facsimile control unit 20 configured to control facsimile communication.

The facsimile control unit 20 is connected with a PBX (private branch exchange) 22 connecting to a PSTN (public switched telephone network) 21 (see FIG. 1), so that the digital color multi-function apparatus 1 can communicate with a remote facsimile apparatus via the PSTN 21.

The image process control unit 10 is connected with a display control unit 23 and an operation input control unit 24. Under control of the image process control unit 10, the display control unit 23 outputs an image display control signal to the information process unit B via a communication cable 26 connected with a control panel I/F (interface) 25, and controls displaying of an image at the operation panel P of the information process unit B.

The operation input control unit 24 inputs, under control of the image process control unit 10, an input control signal responding to setting of a function input by the operator through the operation panel P of the information process unit B, via the communication cable 26 connected with the control panel I/F 25.

Thus, the image process unit A is configured to be capable of directly monitoring the operation panel P of the information process unit B via the communication cable 26. That is, the image process unit A is enabled to utilize the operation panel P of the information process unit B by connecting the image process unit A with the information process unit B via the communication cable 26.

Thus, the display control unit 23 and the operation input control unit 24 of the image process unit A are operated in a state of being connected with the operation panel P.

With the above-described configuration, the image process unit A analyzes print data as image information and a print instruction command from the outside (the server computer 3, the client computers 4, facsimile apparatuses, etc.), bitmaps the print data into output image data, and analyzes a print mode based on the print instruction command to determine an operation. The print data and the command are received via the LAN control unit 18 or the facsimile control unit 20.

The image process unit A is configured to transfer data stored in the SDRAM 14 and the HDD 17, such as print data, data read from an original document, output image data of the print data and the data read from an original document, and compressed data of these data, to external apparatuses (such as the server computer 3, the client computers 4, facsimile apparatuses, etc.).

The image process unit A is configured to transfer image data read with the image read device 8 to the image process control unit 10, to correct signal deterioration caused in an optical system and in conversion to digital signals, and to write the image data into the SDRAM 14. The image data stored in the SDRAM 14 is converted to output image data by the print control unit 11 and is output to the print device 7.

Now, the information process unit B including the operation panel P is described.

The information process unit B is configured like a microcomputer controlled by a standard OS (operating system) used in personal computers. The information process unit B includes a CPU 31 serving as a main processor. The CPU 31 is connected by a bus with a memory unit 32, which is constituted by a RAM serving as a working area of the CPU 31 and a ROM storing a starter program, etc., and a storage device control unit 35 configured to control inputting and outputting of data to and from a storage device 34. The storage device 34 may be constituted by an HDD, etc., and stores the OS and application programs.

The CPU 31 is connected with a LAN control unit 33 serving as a communication interface for connecting the information process unit B with the LAN 2 via the HUB 19. An IP address assigned to the LAN control unit 33 as a network address is different from the one assigned to the LAN control unit 18 of the image process unit A. That is, two IP addresses are assigned to the digital color multi-function apparatus 1.

Thus, the image process unit A and the information process unit B are individually connected with the LAN 2, so that data communication is possible between the image process unit A and the information process unit B.

Because the digital color multi-function apparatus 1 is connected with the LAN 2 via the HUB 19, it looks as if only one IP address is assigned to the digital color multi-function apparatus 1. Thereby, handling of a wire connection is facilitated and a deterioration in the appearance is avoided.

Figure 4:
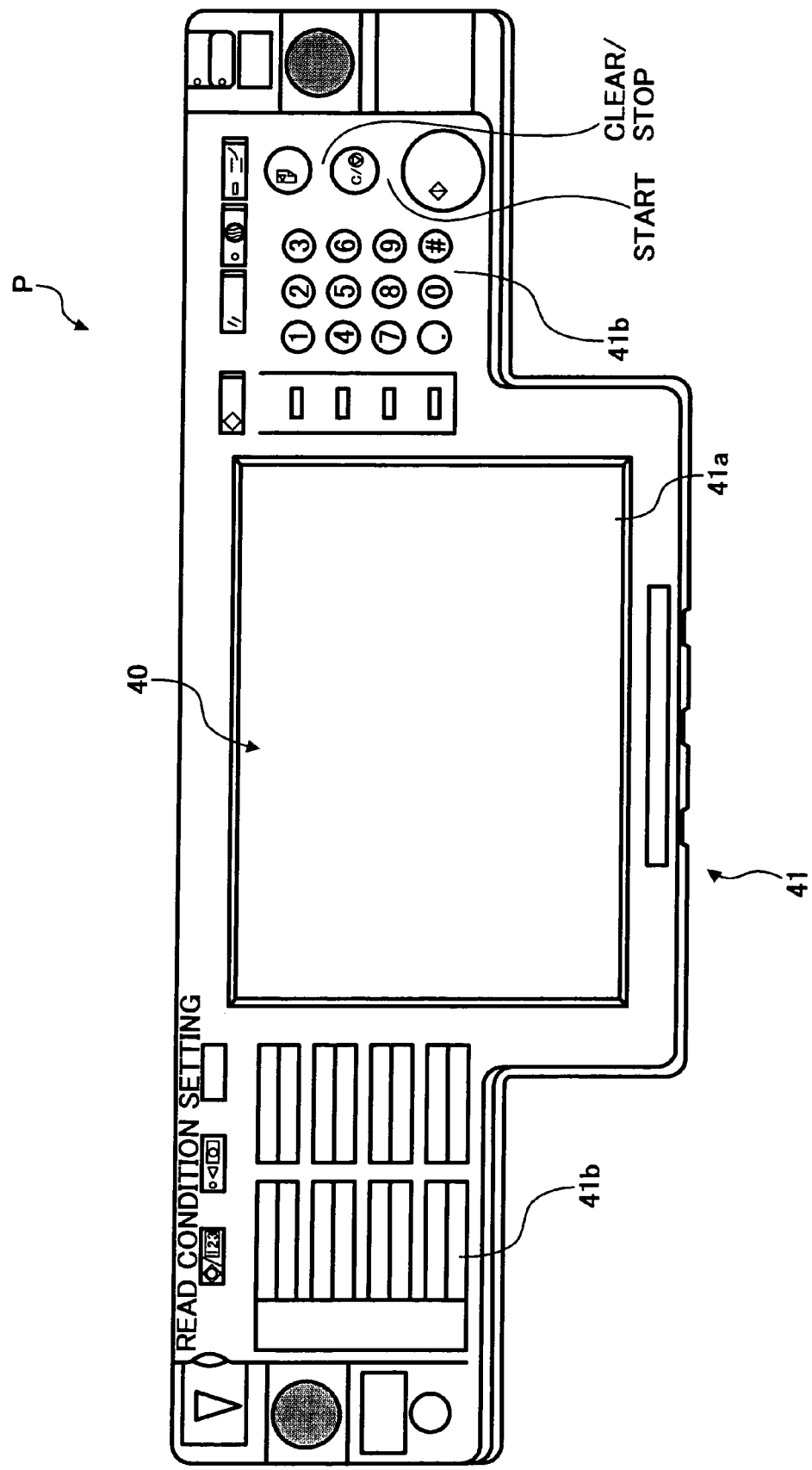
FIG. 4 is a plan view of an operation panel of the digital color multi-function apparatus.

The CPU 31 is further connected with a display control unit 36 and an operation input control unit 37, which are configured to control the operation panel P. FIG. 4 is a plan view of the operation panel P.

As illustrated in FIG. 4, the operation panel P includes a display device 40 constituted by, for example, a LCD (liquid crystal display), and an operation input device 41. The operation input device 41 includes a touch panel 41a of an ultrasonic sound wave method, etc., which is laminated on a surface of the display device 40, and a keyboard 41b having a plurality of keys.

The keyboard 41b is provided with a start key, which, by being depressed, starts reading an image to obtain image data of the image, ten keys, which, by being depressed, input a numerical value, a read condition setting key, which, by being depressed, sets a read condition, a clear/stop key, etc.

Thus, the display control unit 36 outputs an image display control signal to the display device 40 via a control panel I/F 38 and causes the display device 40 to display a predetermined content according to the image display control signal. On the other hand, the operation input control unit 37 receives from an operation input device 41 via the control panel I/F 38 an input control signal corresponding to setting of a function and inputs by the operator at the operation input device 41. The CPU 31 is connected with a control panel communication unit 39, which is connected with the control panel I/F 25 of the image process unit A via the communication cable 26.

The control panel communication unit 39 receives an image display control signal output from the image process unit A, and transfers an input control signal from the operation panel P corresponding to setting of a function and inputs by the operator at the operation panel P to the image process unit A.

The image display control signal from the image process unit A, which has been received by the control panel communication unit 39, is output, after having been converted for use at the display device 40 of the operation panel P, to the display control unit 36. An input control signal from the operation panel P, corresponding to setting of a function and inputs by the operator at the operation panel P, is input, after having been converted to a format corresponding to a specification at the image process unit A, to the control panel communication unit 39, details of which will be described later.

As described above, the OS and the application programs executed by the CPU 31 are stored in the storage device 34, so that the storage device 34 functions as a storage medium storing an application program.

In the digital color multi-function apparatus 1, when the power is turned on, the CPU 31 activates the starter program in the memory unit 32, reads in the OS to the RAM of the memory unit 32 from the storage device 34, and activates the OS. The OS causes a program to be activated, reads in information, and stores the information, in response to an operation by the operator. The family of Windows (registered trademark) is well known among various operating systems. A program that operates under an OS is called an application program. An OS similar to those used in information processing apparatuses (i.e., the server computer 3, the client computers 4, etc.), that is, a standard OS (e.g., Windows, etc.), is used for the OS of the information process unit B.

As described above, the external media input/output device 9 is mounted to the digital color multi-function apparatus 1. The external media input/output device 9 is controlled by an input/output device control unit 42, which is connected with the CPU 31 by the bus. The external media input/output device 9 reads out program codes (of the OS, device drivers, application programs, etc.), image data, etc. stored in the record medium M and writes program codes, image data, etc. into the record medium M. The record medium M may be a FD (flexible disk), a HD (hard disk), an optical disk (CD-ROM, CD-R, CD-RW, DVD-ROM, DVDRAM, DVD–R, DVD+R, DVD–RW, DVD+RW, etc.), an MO (magnetic optical disk), a semiconductor medium, or the like. The external media input/output device 9 may be a FDD (flexible disk drive) device, an optical disk drive device, an MO drive device, or a media drive device, or the like.

Thus, the application programs stored in the storage device 34 may be the ones that are stored in the record medium M and that have been read out from the record medium M and installed to the storage device 34. That is, the record medium M may serve as a storage medium for storing an application program. Further, an application program may be obtained from the outside via the Internet 6 and the LAN 2 to be installed into the storage device 34.

The input/output device control unit 42 is connected with an interface unit 43, which includes a variety of interfaces, such as USB, IEEE1394, SCSI, etc., so that a variety of apparatuses (digital cameras, etc.) may be connected with the digital color multi-function apparatus 1 via the interface unit 43.

Now, a characteristic process executed in the digital color multi-function apparatus 1 is described.

The digital color multi-function apparatus 1 is configured such that the image process unit A and the information process unit B can perform different processes independently from each other. For example, it is possible that while the image process unit A is performing a process of reading an image, the information process unit B can receive an email.

Further, the digital color multi-function apparatus 1 is configured such that each function of the image process unit A can be used by a program operating at the information process part B and a result of using the function of the image process unit A can be a processing object at the information process unit B.

For example, when obtaining a text document by processing image data of an image of a document, that has been obtained with the image read device 8 of the image process unit A, with character recognition software, it is conceivable to transmit the image data to an external computer (e.g., a PC), in which character recognition software is installed, so that the image data is processed at the external computer, or to install character recognition software, that is operable under control of the image process control unit 10, to the image process unit A.

Here, if the image process unit B is tailored to image processing, it is necessary to develop specific character recognition software that is operable at the image process unit B, and if the image process unit B is configured such that general-purpose character recognition software can be installed and operated, it is inevitable that the overall performance of image processing at the image process unit B is decreased.

Figure 5:
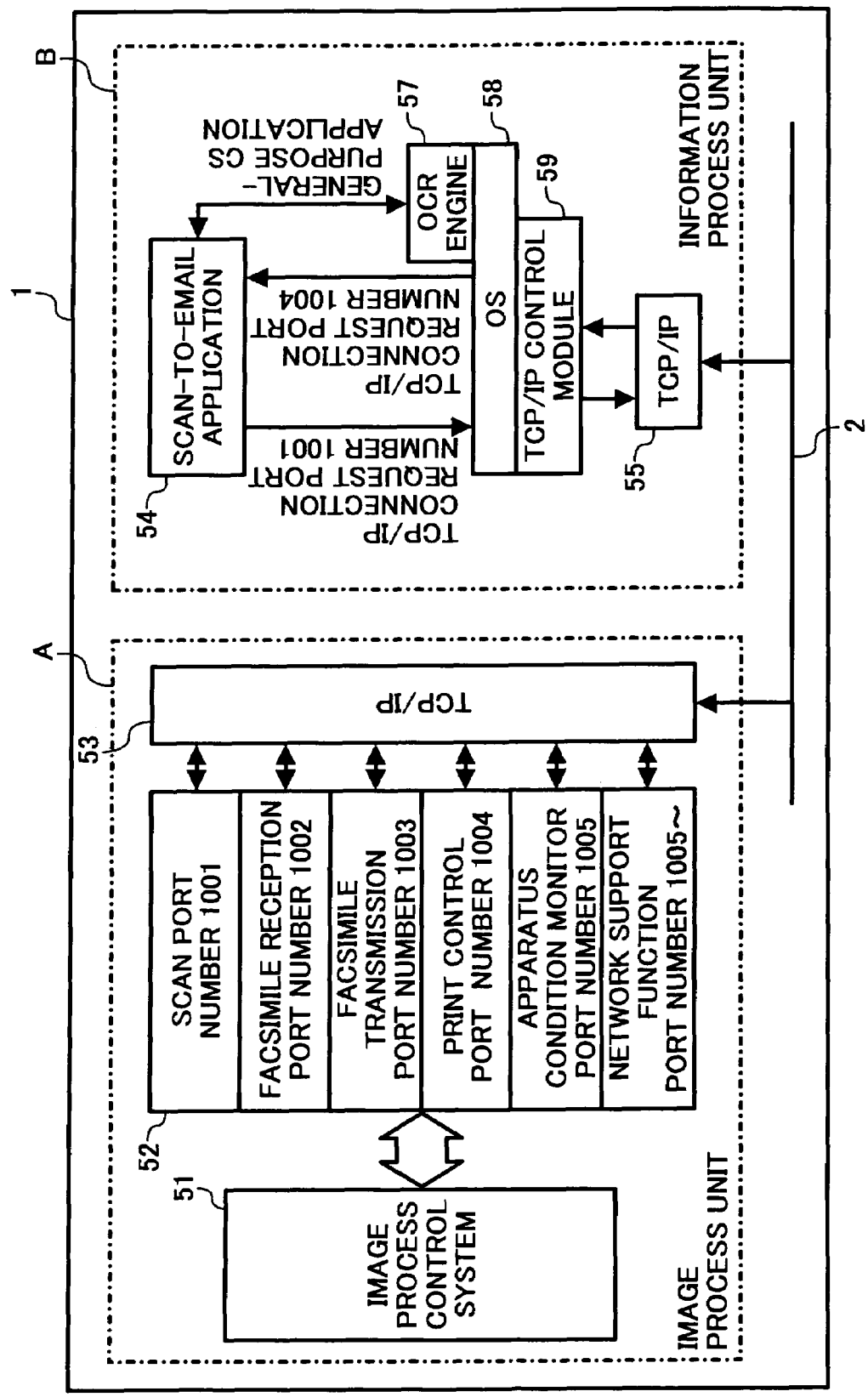
FIG. 5 is a block diagram illustrating process modules of the digital color multi-function apparatus.

To solve the above-described problem, in the digital color multi-function apparatus 1, a commercially available general-purpose operating system (OS) is used in the information process unit B, so that general purpose character recognition software can be operated at the information process unit B without being affected by an operation of the image process unit A, and a program operating at the information process unit B is constituted by combining process modules illustrated in FIG. 5, so that each function of the image process unit A can be used by the program operating at the information process unit B.

FIG. 5 is a block diagram illustrating the process modules of the digital color multi-function apparatus 1.

The image process unit A includes an image process control system 51, which includes control program modules for executing the image process functions of the digital color multi-function apparatus 1 (such as the scanner function, the print function, the image storage function, etc.), and a network support function module 52, which enables the image process functions of the digital color multi-function apparatus 1 (which are executed at the image process control system 51) to be used via the network (i.e., the LAN 2). The image process unit A further includes a TCP/IP 53, which can be accessed only from the image process unit B via the LAN 2.

The network support function module 52 is configured to activate a corresponding program module of the image process control system 51 when the TCP/IP 53, which always monitors access from the network (the LAN 2), has detected a connection request relative to a port number.

For example, when a connection request relative to a port number 1002 has been received, a control program module executing the facsimile reception function is activated at the image process control system 51. The activated module is operated in cooperation with a process request from the connection request originator, and sends back a necessary response to the connection request originator.

The network support function module 52 cannot be used from devices of the image process unit A.

Next, a feature of the process modules of the information process unit B is described.

A scan-to-email application 54 serving as an email transmission device of the present invention extracts image data of an address area, a subject area, and a body area of an original document from image data of the original document, performs character recognition relative to the extracted image data of an address area, a subject area, and a body area of the original document with an OCR (optical character recognition) engine 57 to obtain character strings of the address area, the subject area, and the body area of the original document, sets the obtained character strings of the address area, the subject area, and the body area of the original document as an address, a subject, and a body of an email, and transmits the email while attaching the image data of the original document to the body of the email.

Each application of the information process unit B is operated under management of an operating system (OS) 58. As described above, a commercially available general-purpose operating system, such as Windows (registered trademark), etc., is used for the OS 58.

Further, each application of the information process unit B can use functions provided by the OS 58. That is, in a program executing the application, a necessary process is executed by invoking each of the functions provided by the OS 58 as a software module. For example, a TCP/IP control module 59 executes a function of communicating with terminal apparatuses connected by the TCP/IP 53, which is provided in the OS 58.

Furthermore, each application of the information process unit B can use independent software installed for use by other applications. For example, the OCR engine 57, which performs character recognition only, is not operated independently, and is used as a module of other software.

Thus, the information process unit B is configured such that each application operates under management of the OS 58, so that an application (such as the scan-to-email application 54) can be developed using a function or a combination of functions of other applications.

As described above, in the digital color multi-function apparatus 1, the image process unit A configured to realize the standard image process functions and the information process unit B configured to execute application software are provided, and the image process unit A and the information process unit B are internally connected with each other via the network (LAN 2) by the TCP/IP 53. With this configuration, physical connection of the image process unit A and the information process unit B is realized and data communication between the image process unit A and the information process unit B is enabled.

Next, a method of enabling application software operating at the information process unit B to use a function of the image process unit A is described.

For example, in the scan-to-email application 54, image data as an object for character recognition is the image data read from the image read device 8 managed at the image process unit A.

Here, to instruct the image read device 8 to perform an operation of reading an image, a TCP/IP connection request is transmitted to the image process unit A while designating a port number 1001. Further, at this time, data indicating the content of a requested process is transmitted at the same time as a data stream. Here, the port number 1001 designates, for example, the function that the image read device 8 reads an image and transfers image data of the image to the information process unit B with an arbitrary file name attached thereto. The content of the process of each function is defined in advance, and a port number is assigned to each function so that the function can be used individually.

Thus, using each function of the image process unit A from the scan-to-email application 54 is enabled.

Of course any communication protocol other than TCP/IP may also be used.

The digital color multi-function apparatus 1 may be provided with, in addition to the standard image process functions described above (i.e., the copier function, the scanner function, the print function, the facsimile function, the image storage function, the image distribution function), the following functions: a media browser function, a document browser function, a page browser function, an image process function, a form composition function, a transmission/storage function, an OCR function, a retrieval function, a mail server function, a Web server function, a scheduled execution function, a system monitor function, a security function, a history/condition display function, an individual setting function, an administrator setting function, etc.

The scanner function enables reading an image of a paper original document in a form of an image file and transmitting the image file with email, facsimile transmission, or file transmission using, for example, a Windows share folder system, a Web folder system, FTP software, an external server, etc. The scanner function enables the image file to be stored, for example, in the HDD 17.

The media browser function enables browsing a file stored in the record medium M. Further, the media browser function enables browsing a share folder, an FTP folder, a Web folder, etc. on the network (the LAN 2) in a similar manner as when browsing the record medium M by personally setting the share folder, etc. on the network as a shared virtual medium.

The document browser function enables operating/browsing general documents, images attached to received mails, received facsimile images, etc., stored in the HDD 17. Further, the document browser function includes a document management function, with which names of documents can be changed and documents can be deleted. Furthermore, the document browser function enables retrieving characters in a stored document, which have been recognized in character recognition, and downloading a document from a Web server.

The page browser function enables displaying images in a stored document, a transmitting document, and a printing document. Further, the page browser function enables selecting an image file for printing, transmitting or storing, and browsing and editing various information of a file.

The image process function includes an automatic image process function enabling editing an image before transmitting, storing, or printing the image. The image process function enables correcting image quality, rotating an image, subtracting a color, cutting out an image, deleting a blank, etc.

The form composition function enables generating a new image for transmitting, storing or printing by selecting a form (position information) with a background and by joining a text and/or an image to the selected form. By combining a form generation tool, transmission images and/or print materials can be generated in a wide variety of layouts.

The transmission/storage function enables transmitting image data and/or a file, which has been obtained by scanning a paper original document or selected by media browsing, document browsing or page browsing, to a designated destination by email transmission or facsimile transmission and to a Windows share folder, a FTP server, a Web folder, an external server, etc. by file transmission. Further, the transmission/storage function enables performing character recognition to stored image data to retrieve a character string, and downloading image data and/or a file from a Web server.

The print function enables printing image data and/or a file, which has been selected by media browsing, document browsing or page browsing, while designating a variety of forms and/or layouts.

The OCR function enables extracting a text of a paper original document and/or a received facsimile by performing character recognition to image data of the paper original document and/or image data of the received facsimile. The OCR function includes a function of generating a PDF file by embedding a text obtained by character recognition in an image and to transmit/store the generated PDF file, a retrieval function of retrieving stored image data and facsimile image data by a text obtained by character recognition, and a function of using character strings obtained by character recognition for the address, the document name, the subject, and the body of an email. When a character string obtained by character recognition of a designated area of an original document accords with a registered address, the character string is used for the address, and character strings obtained by character recognition of designated areas of the original document are used for the document name, the subject, and the body of the email.

The retrieval function enables retrieving images and files stored in the apparatus or existing on the network by keywords such as a document name, a file name, a storage date and time, a change date and time, and/or a text obtained by character recognition, and extracting and displaying a file according with the keywords. When retrieving stored image data and facsimile image data by a text obtained by character recognition, character strings obtained by character recognition of image data are covered.

The facsimile function enables receiving facsimile images by facsimile ports provided in the digital color multi-function apparatus 1 (e.g., two G3 facsimile communication ports and one G4 facsimile communication port) as an image file and storing and/or transferring (by way of mail transfer or file transfer) the image file. The transferring addresses of the received facsimiles may be sorted by initial setting according to the originating sources of the received facsimiles and the receiving ports receiving the facsimiles. Further, the facsimile function enables transmitting by facsimile an image file of a paper original document, an image file in a medium, and a stored image file, and transferring an image attached to a received email to another facsimile apparatus.

The mail server function includes a function of transmitting an email, and a function of internally holding a mail address of each individual and a mail address of a guest when setting SMTP (simple mail transfer protocol), automatically printing or transferring by facsimile an image attached to a received email or performing a transmission/storage operation registered to a one-touch button, and returning an email informing of an operation result to the sender.

Here, a combination of operations is provided by default for the mail address of each individual and guest, and setting and changing of the combination of operations can be made in individual setting.

Further, by allocating mail address display names to the mail address of an external mail server when setting POP (post office protocol), an operation substantially the same as one in cases in which SMPT has been set can be realized. To cope with various mail environments, SMPT authentication and POP before SMTP mode can be accommodated with respect to mail transmission, and APOP (authenticated post office protocol) can be accommodated with respect to mail reception.

The web server function enables providing URL (universal resource locators) for each individual and guest, and stored images and files can be browsed, retrieved, downloaded, uploaded, transmitted, stored, and printed. Further, referencing a result of an operation, and setting by an individual setting and administrator setting can be made. Furthermore, to cope with security concerns during communication, SSL server authentication can be accommodated.

The periodic execution function enables deleting stored data past a retention period, receiving POP mails, updating LDAP (lightweight directory access protocol), automatic printing and deleting a history, and automatic rebooting.

The system monitor function enables detecting that a disk is full, that a malfunction has occurred inside the apparatus, that a tray and/or a door have been opened, and that a paper jamming has occurred, and displaying a message, for example, encouraging the user to make a service call. Further, the system monitor function deals with an accounting apparatus monitoring and restricting use by the user.

The security function enables maintaining security of the user operating at the operation panel P, such as authenticating each individual and setting an administrator password, and security of the network, such as authentication of mail transmission, accommodation of APOP, authentication of a SSL server, restriction of access, etc., to protect data from an illegal operation by a guest user and/or an external network.

The history/status display function enables confirming if a result of transmitting, receiving and/or printing an email, a facsimile, and/or a file has been successful, confirming the date and time of execution and completion, confirming execution of canceling a job, and confirming the content of an error that occurred at the time of execution.

The individual setting function enables registering a use environment of each individual user (such as registering mail addresses, customizing screens and operations, setting receiving mail addresses, etc.), individually, without being seen by others. The maximum number of users for which the individual use environment can be set can be 1000.

The administrator setting function enables setting various settings for guest users, setting basic settings for causing respective functions to be operated (such as, setting of the network, setting of time, and setting of automatic booting time), and setting various settings for management (such as setting of user management, setting of the mail environment, and setting of receiving facsimiles).

Figure 6:
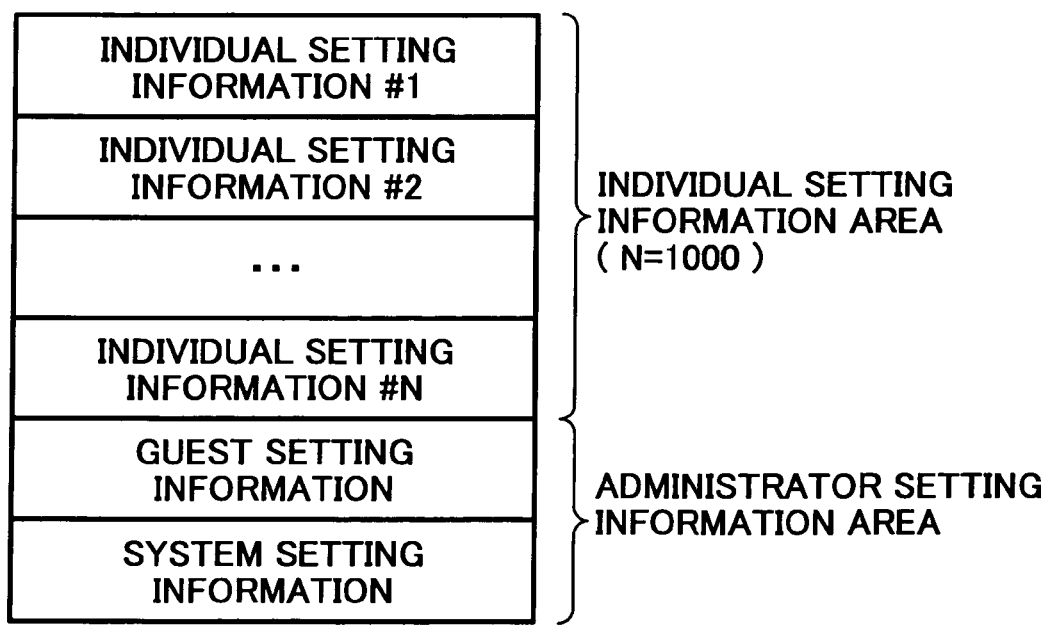
FIG. 6 is a diagram illustrating an example of information area registered to an information process unit of the digital color multi-function apparatus.

For realizing the above-described functions, the information process unit B of the digital color multi-function apparatus 1 is provided with, as illustrated in FIG. 6, an individual setting information area allowing registering individual setting information for, e.g., 1000 individuals and an administrator setting information area for registering guest setting information and system setting information.

Next, concrete non-limiting examples of the individual setting information, the guest setting information, and the system setting information, are described. Here, because the content of the guest setting information is substantially the same as the content of the individual setting information, only portions of the guest setting information that are different from those of the individual setting information are described. Further, combinations of information elements and the concrete content of each information element in the following description are only illustrative examples. In describing each information element, the content described in parenthesis indicates an exemplary value that can be applied to the information element and a partial description thereof.

Figure 7A:
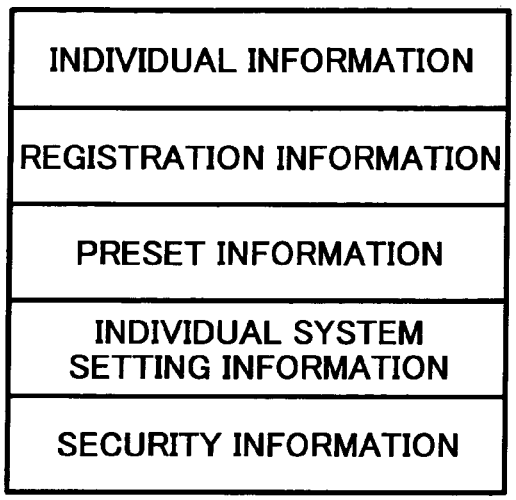
FIG. 7A is a diagram illustrating an example of individual setting information.

The individual setting information includes, for example as illustrated in FIG. 7A, individual information for identifying each individual, registration information for registering a mail address, etc. for each individual, preset information for registering condition setting information for each individual, individual system setting information for storing initial setting information in using the digital color multi-function apparatus 1, and security information for registering the information relating to security.

Figure 7B:
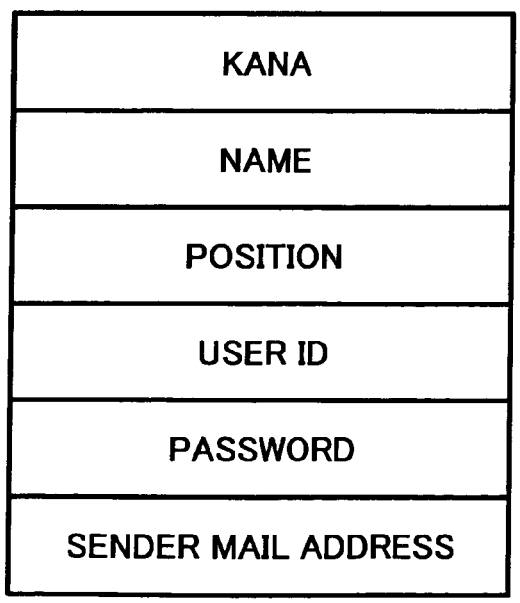
FIG. 7B is a diagram illustrating an example of individual information.

The individual information includes, for example as illustrated in FIG. 7B, "kana" (of the name), "name" (in kanji), "position" (indicating a division, a department, etc., to which the individual belongs), "user ID" for identifying each individual, "password" (which is used in authentication), and "sender mail address".

Here, only names that are unique in the system of the digital color multi-function apparatus 1 can be set for "name". For example, a character string that represents each user and is used for the title of an individual menu, etc. is used for "name".

The "user ID" is used when making the transition from a guest menu in the initial setting state to an individual menu. The "user ID" is also used in URL for the individual menu (e.g., http://host name/"user ID") and in a receiving mail address (e.g., print."user ID"@host name.domain name).

The "sender mail address" is a character string that is set in the "From" field when sending an email, and is automatically set by default in conjunction with setting of a mail receiving protocol of the administrator setting.

For example, when the mail receiving protocol has been set to POP or APOP, the character string, "name"(of the individual information)[sender.user ID]<POP mail address>, is set by default as the sender mail address.

When the mail receiving protocol has been set to SMTP, the character string, "name"(of the individual information)[sender.user ID]@host name.domain name, is set by default as the sender mail address.

Here, "sender" is the default value of the receiving mail address of "error mail" [01] of the received mailbox (described later). Accordingly, after sending an email, when an error mail has been transferred due to an unknown address, the error mail is stored in "error mail" of the received mailbox.

The registration information includes, as an example illustrated in FIG. 8A, "mail address" (100 pieces), each of which is used as the address when sending an email, "facsimile address" (100 pieces), each of which is used as the destination when transmitting a facsimile, "group address" (100 pieces), "file address" (100 pieces), each of which is used as the destination when transmitting a file, "subject/body" (100 pieces), each of which is used as the subject set in the subject field of an email or the content set in the body of an email, and "document name/user name" (100 pieces).

Each mail address includes, as an example illustrated in FIG. 8B, "name" for identifying the mail address, "mail address", "position", and "transmission option designation" for setting whether or not to designate a transmission option. The mail address further includes, with respect to "transmission option designation" set to designate a transmission option, "Internet facsimile transmission" for setting whether or not to perform Internet facsimile transmission, "SMTP server address" which is used when designating the SMTP server, "mail transmission authentication" for setting whether or not to perform authentication in transmitting an email, and "OCR address designation" for setting whether or not to designate a character string obtained by character recognition to the address of an email.

The mail address further includes, with respect to "mail transmission authentication" set to perform authentication in transmitting an email, "authentication method", "authentication POP server address", "authentication user name", and "authentication password".

All files attached to an email addressed to each mail address in which "Internet facsimile transmission" has been set to perform Internet facsimile transmission are transmitted to the mail address after having been converted to network facsimile images (TIFF-F).

When "OCR address designation" has been set to designate a character string obtained by character recognition to the address of an email, if a malfunction or an error has occurred in character recognition, the email is transmitted to a registered mail address.

Registration of a mail address can be made from the mail address obtained from the mail server (with LDAP) using the public address book function.

Each facsimile address includes, as an example illustrated in FIG. 8C, "name" for identifying the facsimile address, "facsimile number", "position", and "transmission option designation" for setting whether or not to designate a transmission option.

Here, a double value within the individual facsimile addresses cannot be registered for "name".

The facsimile address further includes, with respect to "transmission option designation" set to designate a transmission option, "transmission port name" and "OCR address designation" for setting whether or not to designate a character string obtained by character recognition to the address of a facsimile. When "OCR address designation" has been set to designate a character string obtained by character recognition to the address of a facsimile, if a malfunction or an error has occurred in character recognition, the facsimile is transmitted to a registered mail address.

Each group address includes, as an example illustrated in FIG. 8D, "name" for identifying the group address and "mail name" in which one or more mail address names are registered.

Here, a double value within individual group addresses cannot be registered for "name". Further, a double mail address cannot be registered within a group.

Each file address includes, as an example illustrated in FIG. 8E, "name" for identifying the file address, "network path" for registering a value of a network path, which is used when transmitting a file to a Windows share folder, a FTP server folder, or an HTTP (an external server) folder on the network, "log-in user name", "log-in password", "sub-folder name selection" for registering a sub-folder name which is generated at a host apparatus at the file address, and "communication option designation" for setting whether or not to designate a communication option.

The file address further includes, with respect to "communication option designation" set to designate a communication option, "FTP Japanese mode" for designating the FTP Japanese mode (e.g., a shifted JIS code, an extended UNIX code), "FTP data transfer mode" for designating the FTP data transmission mode (e.g., a PORT mode, a PASV mode), and "OCR address designation".

Here, "network path" includes, in addition to a network path illustrated in FIG. 9A, a local path illustrated in FIG. 9B.

Here, "external server plug-in" (FIG. 9A) is a function of enabling transfer of a file and designation of a shared media relative to a variety of external servers in a similar manner as in the scheme of FTP and HTTP, without having a sense of difference in the interface. In FIG. 9B, "CompactFlash", "SmartMedia", "SD memory card", and "memory stick" are registered trademarks, respectively.

Each subject/body includes, as an example illustrated in FIG. 9C, "subject" for registering a character string which is used as the subject of an email when transmitting the email and "body" for registering a character string which is used as the body of an email when transmitting the email.

Each document name/user name includes, as an example illustrated in FIG. 9D, "document name" for registering a character string which is used as the document name when storing a document, "OCR" for setting whether or not to perform OCR (optical character recognition), and "user name" for registering a character string which is used as the user name.

When "OCR" has been set to perform optical character recognition, if a malfunction or an error has occurred in character recognition, a registered document name is used for the document name.

The preset information includes, as an example illustrated in FIG. 10A, "read condition" (12 pieces), "image process condition" (12 pieces), "transmission/storage condition one-touch" (20 pieces), "print condition one-touch" (20 pieces), "received mailbox" (12 pieces), "shared media address" (12 pieces), and "file transmission link address" (12 pieces).

Here, the information of "read condition" and the information of "image process condition" are contents registered to preset buttons which are displayed on an operation screen, the information of "transmission/storage condition" and the information of "print condition" are contents registered to one-touch buttons which are displayed on an operation screen, and the information of "received mailbox", the information of "shared media address", and the information of "file transmission link address" are contents registered to button icons which are displayed on an operation screen.

When each of the preset buttons, the one-touch buttons, and the button icons has been operated, a corresponding operation is executed with the contents registered to the button applied to the operation.

Each read condition includes, as an example illustrated in FIG. 10B, "name" for identifying the read condition on a preset button, "icon" for designating the icon symbolically displaying the read condition on the preset button, "display/non-display" for setting whether or not to display the read condition (and for designating the style of display when displaying the read condition), "original document type" for designating the type of an original document (e.g., black-and-white characters, black-and white photos, gray scale, full color, etc.), "image quality" for designating the reading quality when reading an image (e.g., in grades of 9 starting from a most highly compressed grade to a least compressed grade), "resolution" for designating the reading resolution when reading an image (e.g., 100 DPI, 200 DPI, 300 DPI, 400 DPI, 600 DPI), "read density" for designating the reading density when reading an image (e.g., automatic setting, manual setting in grades of 7), "read size" for designating the reading area on an original document (e.g., automatic size setting, regular size, irregular size), "frame deletion" for setting whether or not to delete a frame defining the reading area designated by "read size", and "both-side read" for setting whether or not to read images on both sides of an original document.

Here, when a value of "read size" is other than "automatic size setting", a designated value is set to "regular size" or "irregular size".

Each image process condition includes, as an example illustrated in FIG. 11A and FIG. 11B, "name" for identifying the image process condition on a preset button, "icon" for designating the icon symbolically displaying the image process condition on the preset button, "display/non-display" for setting whether or not to display the image process condition (and for designating the style of display when displaying the image process condition), "image quality correction" for setting whether or not to perform an image quality correction process, "rotation" for setting whether or not to perform an image rotation process, "color subtraction/conversion to black-and-white" for setting whether or not to perform a color subtraction process or a conversion process to black-to-white, "cutout" for setting whether or not to perform an image cutout process, and "blank deletion" for setting whether or not to perform a blank deletion process.

The image process condition further includes, with respect to "image quality correction" set to perform the image quality correction process, "page number designation" for designating the page number to which the image quality correction process is applied, and "automatic image quality correction" for designating the content of image quality correction (e.g., automatic image quality correction, manual image quality correction). The image process condition further includes, with respect to "automatic image quality correction" in which the manual image quality correction has been designated, "brightness", "contrast", "clearness", and "color" for manually correcting image quality.

The image process condition further includes, with respect to "rotation" set to perform the image rotation process, "page number designation" for designating the page number to which the image rotation process is applied and "rotation direction" for designating the rotation direction.

The image process condition further includes, with respect to "color subtraction/conversion to black-and-white" set to perform the color subtraction process or the conversion process to black-and-white, "page number designation" for designating the page number to which the color subtraction process or the conversion process to black-and-white is applied, "the number of colors" for designating the number of colors after the color subtraction process has been performed, "dropout color" for designating the dropout color (e.g., none, red, blue, green, chromatic color), "character area color subtraction" for setting whether or not to apply the color subtraction process or the conversion process to black-and-white only to the character area, and "non-character area resolution" for setting whether or not to change the resolution of an image after performing the color subtraction process (e.g., no change, one-half, one-fourth).

The image process condition further includes, with respect to "cutout" set to perform the image cutout process, "page number designation" for designating the page number to which the image cutout process is applied, "cutout area" for designating the image area to which the image cutout process is applied (by selecting form data from existing form data or form data that has been generated by designating areas of obtained or selected image data), "original image" for designating how to treat an original image to which the image cutout process has been performed (e.g., to keep the original image or to delete the original image), and "original image resolution" for designating the resolution to be applied to the original image when the original image is kept (e.g., the same, one-half, one-fourth).

The image process condition further includes, with respect to "blank deletion" set to perform the blank deletion process, "page number designation" for designating the page number to which the blank deletion process is applied.

Each transmission/storage condition one-touch includes, for example as illustrated in FIG. 12A and FIG. 12B, "name" for identifying the transmission/storage condition one-touch on a one-touch button, "character size" for designating the character size to be applied when displaying the name of the transmission/storage condition one-touch on the one-touch button, "icon" for designating the icon symbolically displaying the transmission/storage condition one-touch on the one-touch button, "display/non-display" for setting whether or not to display the transmission/storage condition one-touch (and for designating the style of display when displaying the transmission/storage condition one-touch), "address" in which one or more addresses (max 100 pieces) that are used when transmitting an email have been registered, "subject" in which a subject that is used when transmitting an email has been registered, "body" in which the content of a body that is used when transmitting an email has been registered, "storage" for setting whether or not to store a document and whether or not to publish the document, "document name" in which a document name that is used when storing a document has been registered, "user name" in which a user name that is requested in an authentication operation applied in referencing a stored document has been registered, "password" in which a password that is requested in the authentication operation applied in referencing the stored document has been registered, "split storage" for setting whether or not to split a document when storing the document (and for designating the page number to split the document when splitting the document), "thumbnail designation" for setting whether or not to designate the page number and the image area for generating a thumbnail image of a stored document (and for designating the page number and the image area when it has been set to designate the page number and the image area), "address" in which an address that is used when transmitting a file has been registered, "document name" in which a document name that is used in transmitting a file has been registered, "transmission option designation" for setting whether or not to designate a transmission option, "read condition" for designating a read condition when generating an image, "image process condition" for designating the image process condition when generating an image, and "transmission/storage form designation" for setting whether or not to designate the form (by selecting a form from form data) when transmitting and/or storing a document.

The transmission/storage condition one touch further includes, with respect to "transmission option designation" set to designate the transmission option, "file format" for setting whether or not to change the file format and for designating the file format when changing the file format (e.g., an image file, an image PDF, or an image PDF+OCR), and "link transmission" for setting whether or not to apply link transmission.

The transmission/storage condition one touch further includes, with respect to "link transmission" set to apply link transmission, "link format" for designating the type of a link format (e.g., a document storage link, a file transmission link to be selected from file transmission link addresses), "thumbnail transmission" for setting whether or not to transmit a thumbnail image, and "file compression" for setting whether or not to compress a transmission file. When "file compression" has been set to compress a file, in transmitting an email or a file, all files for transmission are compressed with a predetermined compression method.

The transmission/storage condition one touch further includes, with respect to "transmission/storage form designation" set to designate the form, "file name" for setting whether or not to synthesize the file name from a form, "file date" for setting whether or not to synthesize the file date from a form, and "individual name" for setting whether or not to synthesize the individual name from a form.

Each print condition one-touch includes, for example as illustrated in FIG. 13, "name" for identifying the print condition on a one-touch button, "character size" for designating the character size to be applied when displaying the print condition on the one-touch button, "icon" for designating the icon symbolically displaying the print condition on the one-touch button, "display/non-display" for setting whether or not to display the print condition (and for designating the style of display when displaying the print condition), "print format" for designating the print format (e.g., layout print, repeat print), "color format" for designating the color format (e.g., full color, black-and-white, two colors in black and magenta, two colors in black and cyan), "image quality first/speed first" for designating to which priority is given in printing, the image quality or the print speed, "both-side print" for setting whether or not to perform both-side printing and for designating the style of both-side printing when performing both-side printing (e.g., a right-and-left spread opening type or an up-and-down spread opening type), "sort/stack" for designating the sort process after printing (e.g., sorting, stacking), "punch" for designating the punch process after printing (e.g., punching two holes at the left side, punching two holes at the upper side, punching two holes at the right side, no punching), "staple" for designating the staple process after printing (e.g., stapling at the upper left portion, stapling at the upper right portion, stapling at the center portion, stapling at two portions at the left side, stapling at two portions at the upper side, stapling at two portions at the right side, no stapling), "sheet selection" for designating the sheet (by automatic selection or by selection from among selectable sizes), "image process condition" for designating the image process condition in printing, and "print form designation" for setting whether or not to designate the print form (and for designating the print form by making selection from among form data when it has been set to designate the print form).

The print condition one touch further includes, with respect to "print form designation" set to designate the print form, "file name" for setting whether or not to synthesize the file name with a form, "file date" for setting whether or not to synthesize the file date with a form, and "individual name" for setting whether or not to synthesize the individual name with a form.

Here, when "print format" has been designated to "repeat print", the same image is used for the inserting image of a form. With respect to "punch", when a finisher is not provided to the digital color multi-function apparatus 1, the punch process cannot be designated. Further, the number of holes that can be punched depends on the capability of a finisher provided to the digital color multi-function apparatus 1. With respect to "staple", designation of the staple process is effective only when the number of prints is two or more, and designation of the staple process cannot be made when a finisher is not provided. Furthermore, whether or not designation of stapling at the center portion is effective depends on the capability of a finisher provided to the digital color multi-function apparatus 1. With respect to "sheet selection", the sheet size being selected on the print details setting screen is registered to the one-touch button.

Each received mailbox includes, for example as illustrated in FIG. 14A, "name" for identifying the received mailbox, "icon" for designating the icon symbolically displaying the received mailbox, "account name" for registering the account name for using the received mailbox, "transmission/storage" for setting to perform transmitting and storing only relative to the storage mailbox (described later), "facsimile transmission" for setting to perform facsimile transmitting only relative to the facsimile mailbox (described later), "print" for setting to perform printing only relative to the print mailbox (described later), "covering letter form designation" for always setting not to perform designating the covering letter form relative to the error mailbox (described later) and setting to perform designating the covering letter form relative to the facsimile mailbox and the print mailbox and setting select values relative to other mailboxes, "result mail return" for always setting not to perform transmitting an output result return mail relative to the error mailbox and setting select values relative to other mailboxes, and "received facsimile transfer destination setting" for setting to perform received facsimile transfer destination setting only relative to the storage mailbox and setting not to perform received facsimile destination setting relative to other mailboxes.

Here, the initial values of "name" are set by system default, as illustrated in FIG. 14B, as follows:

Received mailbox [01]: error mail (the error mails, such as a notice of a distribution error of an email, are received).

Received mailbox [02]: facsimile mail (the received mails are treated as the mails for facsimile transfer).

Received mailbox [03]: print mail (the received mails are treated as the mails for printing, and the content of each of which and the attached file are printed).

Received mailbox [04]: storage mail (the received mails are treated as the mails for storing, and the content of each of which and the attached file are stored).

Received mailbox [05]-[12]: blank (arbitrary settings can be made by the user).

The initial value of "account name" is set by system default, as illustrated in FIG. 14C, as follows:

Received mailbox [01]: sender,

Received mailbox [02]: facsimile,

Received mailbox [03]: print,

Received mailbox [04]: store,

Received mailbox [05]-[12]: blank.

The user can make arbitrary settings to the received mailbox [05]-[12].

Here, a unique character string is necessary for "account name" of each received mailbox for each individual setting, and the mail address is set as follows: "display name"<account name=parameter.user ID@identifier.host name.domain name>. Here, the parameter is the telephone number in facsimile transmission and the number of prints in printing. When the parameter of the number of prints is omitted, it indicates that the number of prints is 1. The parameter is not used in file transmission. The SMTP/POP receiving mail addresses that can be actually used are noted on the buttons displayed on a setting/storage screen.

With respect to "transmission/storage", designation of the transmission/storage form can be made with the transmission/storage condition one-touch, and in this case, the received mails are stored to "general document". The received mails can be always stored to "received mail" by designation of private mail and by designating the subject as the document name, without designating the password.

With respect to "facsimile transmission", the facsimile address extracted from the parameter of "To-mail address" is automatically added to the mail address of the designated preset transmission/storage condition.

With respect to "print", the print form can be designated using the print condition one-touch button.

With respect to "covering letter form designation", selection is made from forms into which a mail header and a mail body can be inserted. When "covering letter form designation" has been set to perform designating the covering letter form, a designated form is applied only to the mail header and the mail body. When "covering letter form designation" has been designated not to perform designating the covering letter form, a text file form of the basic setting is applied. The text file form of the basic setting is always applied to text files attached to mail.

When "result mail return" has been set to transmit an output result return mail, because an output image can be always browsed on the Web, the output result return mail is transmitted without attaching the output image.

When "received facsimile transfer destination setting" has been set to perform received facsimile transfer destination setting relative to the storage mailbox of the received mailbox, a received facsimile is transferred to the user set as the received facsimile transfer destination at that time.

Each shared media address includes, for example as illustrated in FIG. 14D, "name" for identifying the shared media address, "icon" for designating the icon symbolically displaying the shared media address, "display/non-display" for designating whether or not to display the shared media address (and for designating the style of display when displaying the shared media address), "shared media address" for storing an address value selected from "file address" of the registration information, and "file arrangement order" for designating the sequential order of files when displaying the files (e.g., no designation, in name ascending order, in name descending order, in date and time ascending order, in date and time descending order, in size ascending order, in size descending order).

When "file arrangement order" has been designated to "no designation", files are displayed in order of physical arrangement of the files in a medium. For example, in a case of files of a digital camera, the files are normally displayed in order of photographing and in the file name ascending order, and in a case of an external server, the files are displayed as prescribed in the external server, for example, in the updating date/time descending order. In this case, a newest file comes on the top.

Each file transmission link address includes, for example as illustrated in FIG. 14E, "name" for identifying the file transmission link address, "icon" for designating the icon symbolically displaying the file transmission link address, "display/non-display" for setting whether or not to display the file transmission link address (and for designating the style of display when displaying the file transmission link address), "file transmission destination" for designating the transmission destination address of a file (the address in uploading the file), "transmission link address" designating the link address which is designated when other users acquire a transmitted file, and "automatic deletion setting" for setting whether or not to automatically delete a file and for designating the time of deleting the file (e.g., between 1 day and 180 days of the storage period).

The individual system setting information includes, for example as illustrated in FIG. 15A, "basic setting", "display setting", "read setting", "communication setting", "storage setting", "print setting", and "OCR setting".

The basic setting includes, for example as illustrated in FIG. 15B, "individual menu automatic termination" for setting whether or not to automatically terminate the individual menu (the individual setting information only) when a non-operated state continues and for designating the time of automatically terminating the individual menu (e.g., between 10 seconds and 99 seconds of the non-operated state) when it has been set to automatically terminate the individual menu, "automatic clear time setting" for setting whether or not to automatically clear an input value of the guest menu (the guest setting information only) when a non-operated state continues and for designating the time of automatically clearing the input value of the guest menu (e.g., between 10 seconds and 999 seconds of the non-operated state) when it has been set to automatically clear the input value of the guest menu, "return to main screen after operation completion" for setting whether or not to return to the main screen after an operation by the user has been completed, "key-input/screen-touch sound setting" for setting whether or not to cause each key input and screen touch to sound, "mail subject automatic input" for setting whether or not to automatically input the mail subject (when inputting, by selecting the mail subject from registered subjects) in transmitting an email, "mail body automatic input" for setting whether or not to automatically input the mail body (when inputting, by selecting the mail body from registered bodies) in transmitting an email, "compression setting in conversion to TIFF image" for designating the compression method in converting image data to a TIFF format (e.g., no compression, MH, MR, MMR), "image quality setting in conversion to JPEG image" for designating the image quality in converting image data to a JPEG format (e.g., 9 grades), "maximum number of colors in conversion to PNG image" for designating the maximum number of colors in converting image data to a PNG format (e.g., 2, 4, 8, 16, 32, 64, 128, 256 colors).

Figure 16:
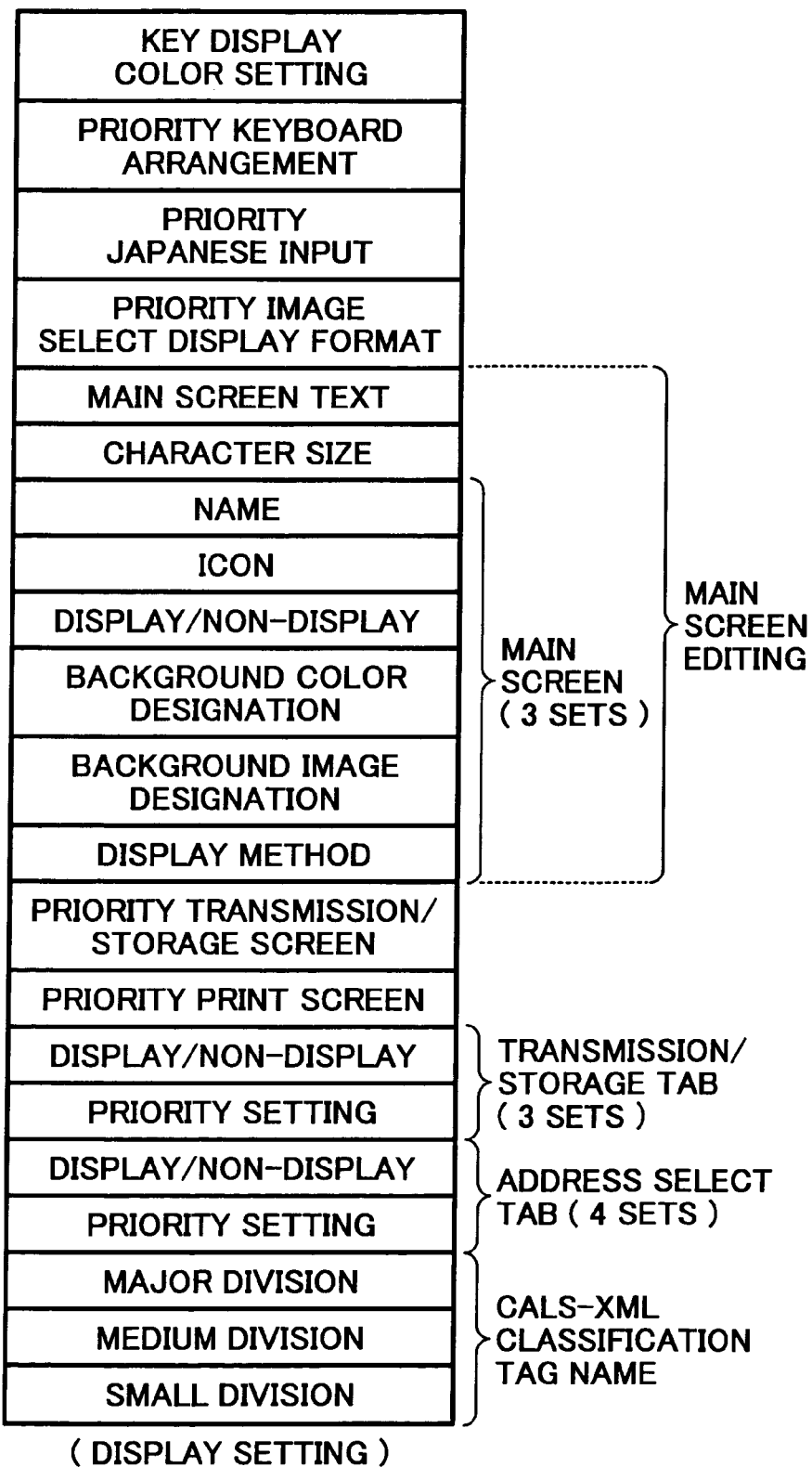
FIG. 16 is a diagram illustrating an example of a display setting.

The display setting includes, for example as illustrated in FIG. 16, "key display color setting" for setting the display color of a keyboard displayed on a screen, "priority keyboard arrangement" for designating the priority value of key arrangement of the keyboard displayed on a screen (e.g., QWERY type, ABC type), "priority Japanese input" for designating the priority value of the Japanese input method (e.g., Roman character, kana character), "priority image select display format" for designating the priority value of the display format when selecting an image (e.g., thumbnail display, list display), "main screen text" for designating the type of a text displayed on the main screen, and "character size" for designating the size of a text displayed on the main screen. The display setting further includes "name, "icon", "display/non-display" (when displaying, the arrangement order is reversed), "background color designation" for setting whether or not to designate the background color (when designating the background color, by selecting the color from among 216 Web safe colors), "background image designation" for setting whether or not to designate the background image (when designating the background image, by selecting the image), and "display method" for designating the display method (e.g., displaying after putting in order, displaying after enlarging) with respect to the main screens of "paper document", "media document" and "storage document". The display setting further includes "priority transmission/storage screen" for designating the priority screen displayed on the transmission/storage screen (e.g., one-touch screen, detail setting screen) and "priority print screen" for designating the priority screen displayed on the print screen (one-touch screen, detail setting screen). Further, the display setting includes "display/non-display" (when displaying, the arrangement order is reversed) and "priority setting" with respect to transmission/storage tabs of "mail transmission", "document storage", "file transmission", and "display/non-display" (when displaying, the arrangement order is reversed) and "priority setting" with respect to address select tabs of "mail address", "facsimile address", "group address" and "public address book", and "major division", "medium division" and "small division" of CALS-XML classification tag names.

Figure 17A:
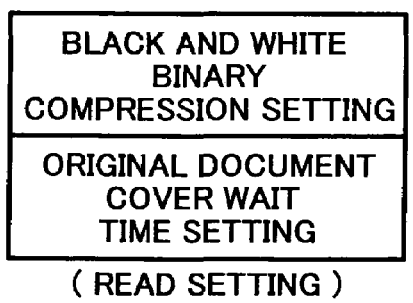
FIG. 17A is a diagram illustrating an example of a read setting.

The read setting includes, for example as illustrated in FIG. 17A, "black and white binary compression setting" for designating the compression method (e.g., no compression, MR, MH, MMR), and "original document cover wait time setting" for setting whether or not to set the waiting time for an original document cover (and for setting the waiting time between 60 seconds and 999 seconds).

Figure 17B:
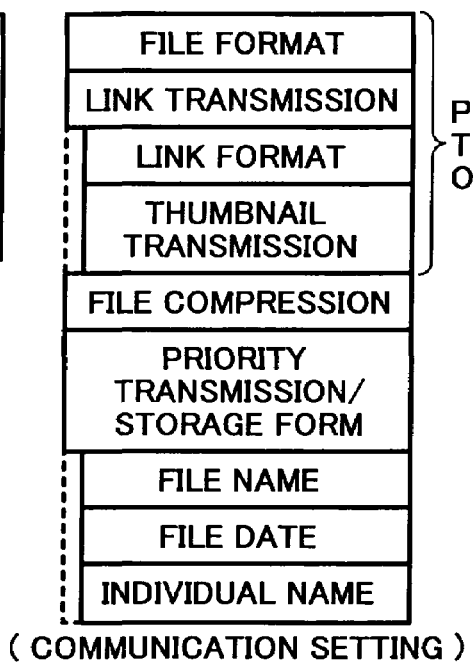
FIG. 17B is a diagram illustrating an example of a communication setting.

The communication setting includes, for example as illustrated in FIG. 17B, "file format" for setting the file format with respect to the priority transmission option (e.g., no change, an image file, an image PDF, an image PDF+OCR), "link transmission" for setting whether or not to perform link transmission (effective only relative to mail addresses), "file compression" for setting whether or not to compress a file, and "priority transmission/storage form" for setting whether or not to designate the form in priority transmission and storage (when designating the form, by selecting the form from among existing forms).

The communication setting further includes, with respect to "link transmission" set to perform link transmission, "link format" for designating the link format (e.g., document storage link, file transmission link to be selected from file transmission link addresses), and "thumbnail transmission" for setting whether or not to perform thumbnail transmission. In thumbnail transmission, each thumbnail image is transmitted in an image PDF. The wired transmission option is effective when the transmission format is not designated in the transmission/storage condition preset.

The "priority transmission/storage form" is used when the transmission/storage form has not been designated with the transmission/storage one-touch button, and includes "file name" for setting whether or not to designate the file name, "file date" for setting whether or not to designate the file date, and "individual name" for setting whether or not to designate the individual name.

Figure 17C:
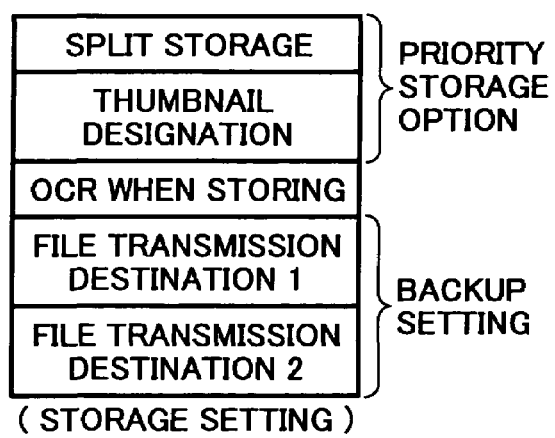
FIG. 17C is a diagram illustrating an example of a storage setting.

The storage setting includes, for example as illustrated in FIG. 17C, "split storage" for setting whether or not to split a document when storing the document and for designating the page number to split the document when splitting the document, "thumbnail designation" for setting whether or not to designate the page number and the image area for generating the thumbnail image of a stored document, "OCR when storing" for setting whether or not to perform character recognition when storing a file, "file transmission destination 1 (primary destination)" and "file transmission destination 2 (secondary destination)" for setting locations for transmitting a copy of a file as backup at the same time when storing the file.

Here, when "OCR when storing" has been set to perform character recognition when storing a file, the character recognition is performed only relative to general documents being stored.

The print setting includes, for example as illustrated in FIG. 18A, "priority print format" (e.g., layout print, repeat print), "priority print color" (e.g., full color, black and white, black and cyan, black and magenta), "priority sheet feed tray" (e.g. automatic sheet selection, tray 1, tray 2, tray 3, large volume feed tray, manual feed tray), "sheet size" (effective only when "priority sheet feed tray" has been set to "manual feed tray"), "sheet type" (effective only when "priority sheet feed tray" has been set to "manual feed tray"), "priority print form" (selectable from existing forms), "brightness" (selectable between −50% and +60%), "contrast" (selectable between −50% and +50%), "clearness" (selectable between −50% and +50%), "red balance" (selectable between −50% and +50%), "green balance" (selectable between −50% and +50%), and "blue balance" (selectable between −50% and +50%).

The print setting further includes, with respect to "priority print form" in which form data has been selected, "file name" for setting whether or not to designate the file name, "file date" for setting whether or not to designate the file data, and "individual name" for setting whether or not to designate the individual name.

The OCR setting includes, for example as illustrated in FIG. 18B, "OCR direction" for designating the character recognition direction (automatic designation, horizontal writing direction, vertical writing direction, horizontal writing/vertical writing direction, one column horizontal writing direction, one column vertical writing direction), "OCR language" for designating the OCR language (e.g., automatic designation, Japanese, English), "OCR original document" for designating the type of an original document (e.g., automatic designation, sentence, table), and "OCR max character size" for designating the maximum character size (between 6 point and 64 point).

The security information includes, for example as illustrated in FIG. 19A, "network access restriction", "mail transmission authentication", and "access right setting".

The network access restriction includes, for example as illustrated in FIG. 19B, "HTTP access restriction" for setting whether or not to set HTTP access restriction to IP addresses (20 pieces) and "SMTP/POP access restriction" for setting whether or not to set SMTP/POP access restriction to SMTP/POP servers (20 pieces).

When "HTTP access restriction" and "SMTP/POP access restriction" have been set not to set HTTP access restriction and SMTP/POP access restriction, respectively, the content of the administrator setting is applied to "HTTP access restriction" and "SMTP/POP access restriction".

The mail transmission authentication includes, for example as illustrated in FIG. 19C, "mail transmission authentication" for setting whether or not to set authentication information for each individual. The mail transmission authentication further includes, with respect to "mail transmission authentication" set to set authentication information for each individual, "authentication method" for designating the authentication method (e.g., SMTP authentication, POP authentication), "authentication POP server address" for designating the POP server address (effective only when POP authentication has been designated), "authentication user name" for designating the user name which is used in SMTP/POP authentication, and "authentication password" for designating the password which is used in SMTP/POP authentication.

The access right setting includes, for example as illustrated in FIG. 19D, "authority class" for designating the class of authority (e.g., the administrator class, the general user class), "function restriction" for setting whether or not to perform functional restriction, "file transmission" for setting whether or not to allow file transmission, "full color print" for setting whether or not to allow full color printing, and "administrator user code".

The access right setting further includes, with respect to "function restriction" set to perform function restriction, "copy" for setting whether or not to allow using the copy function, "document box" for setting whether or not to allow using the document box function, "facsimile" for setting whether or not to allow using the facsimile function, "printer" for setting whether or not to allow using the print function, "scanner" for setting whether or not to allow using the scanner function, "mail transmission" for setting whether or not to allow mail transmission, "document storage" for setting whether or not to allow storing documents, and "automatic deletion setting" for setting whether or not to allow setting automatic deletion.

The access right setting further includes, with respect to "document storage" set to allow storing documents, "individual capacity designation" for setting whether or not to designate the storage capacity for each individual and for designating the storage capacity between 0.1 GB and 99.9 GB when designating the storage capacity, and "storage document password automatic input" for setting whether or not to automatically input the storage document password.

The access right setting further includes, with respect to "automatic deletion setting" set to allow setting automatic deletion, "general document" for setting whether or not to perform automatic deletion relative to general documents and designating the time of automatically deleting the general documents between 1 day and 180 days of the storage period when it has been set to perform automatic deletion, "received mail" for setting whether or not to perform automatic deletion relative to the received mails and designating the time of automatically deleting the received mails between 1 day and 180 days of the storage period when it has been set to perform automatic deletion, and "pre-transmission tray" for setting whether or not to perform automatic deletion relative to the pre-transmission mails (the mails before transmission) and designating the time of deleting the pre-transmission mails between 1 day and 180 days of the storage period when it has been set to perform automatic deletion.

The system setting information includes, for example as illustrated in FIG. 20A, "network setting", "mail setting", "facsimile setting", "file transmission and reception setting", and "system management".

The network setting includes, for example as illustrated in FIG. 20B and FIG. 20C, "host name", "domain name", "IP address", "sub-network mask", "gateway address", "DNS server address 1" (the IP address of the primary DNS server), "DNS server address 2" (the IP address of the secondary DNS server), "proxy server setting" for setting whether or not to set the proxy server, "SSL (secure sockets layer) encryption" for setting whether or not to perform SSL encryption, "port number setting" for setting whether or not to perform port number setting, "printer IP address", "LAN speed" for setting the LAN speed (e.g., automatic setting, 10 Mbps fixed full-duplex, 100 Mbps fixed full-duplex, 10 Mbps half-duplex, 100 Mbps half-duplex), and "physical address" (e.g., MAC address).

The network setting further includes, with respect to "proxy server setting" set to set the proxy server, "proxy server address", "proxy server port number", "proxy unused address", "user name", and "password".

The network setting further includes, with respect to "SSL encryption" set to perform SSL encryption, "ISO country code", "prefecture name", "municipality", "company name/organization name", "division name/organization name, position", "server name", "administrator mail address", and "expiration date". The initial value of "server name" is set to that of "host name".

The network setting further includes, with respect to "port number setting" set to perform port number setting, "SMTP transmission" (the initial value is 25), "SMTP reception" (the initial value is 25; 0-65535), "POP" (the initial value is 110; 0-65535), "FTP" (the initial value is 21; 0-65535), "HTTP" (the initial value is 80; 0-65535), "HTTPS" (the initial value is 443; 0-65535), and "LDAP" (the initial value is 389; 0-65535).

When the port number of "SMTP transmission" has been designated to 0, the SMTP transmission function cannot be used.

The mail setting includes, for example as illustrated in FIG. 21A and FIG. 21B, "SMTP server IP address", "mail reception protocol" (e.g., SMPT, POP3, APOP), "POP mail address", "POP server address", "POP account name", "POP password", "POP mail reception interval", "POP mail rule transfer destination" (e.g., the received mail address of the guest setting information), "use of public address book" for setting whether or not to use the public address book, "mail transmission authentication" for setting whether or not to perform authentication in mail transmission, "transmission size restriction" for setting whether or not to restrict the transmission size, "transmission interval" for designating the transmission interval between 0 and 99 seconds, "retransmission interval" for designating the retransmission interval between 1 and 99 minutes, and "the number of retransmission times" for designating the number of retransmission times between 0 and 99 times.

The mail setting further includes, with respect to "use of public address book" set to use the public address book, "LDAP server address 1", "identification name", "LDAP server address 2", "identification name", and "public address book automatic updating" for setting whether or not to perform automatic updating of the public address book and designating the interval of performing automatic updating of the public address book in units of 10 minutes when it has been set to perform automatic updating of the public address book.

The mail setting further includes, with respect to "mail transmission authentication" set to perform authentication, "authentication method" (e.g., SMTP authentication, POP authentication), "authentication POP server address", "authentication user name", and "authentication password".

The mail setting further includes, with respect to "transmission size restriction" set to restrict the transmission size, "max size" for designating the max size between 1-20 MB, and "mail split" for setting whether or not to split a mail and designating the splitting number between 2-99 when splitting the mail.

Figure 22A:
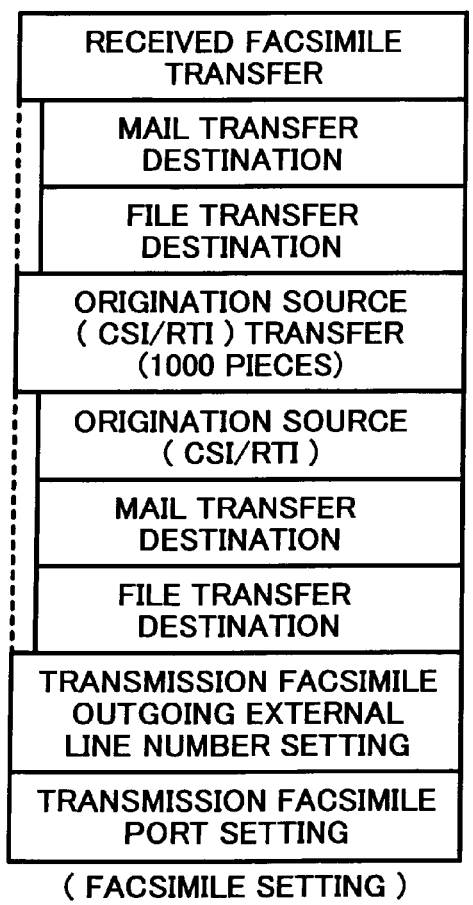
FIG. 22A is a diagram illustrating an example of a facsimile setting.

The facsimile setting is applied to setting of the function of sorting transfer destinations (mail/file transfer destinations) at the time of receiving a facsimile, and includes, for example as illustrated in FIG. 22A, "received facsimile transfer" for setting whether or not to transfer a received facsimile, "origination source (CSI/RTI) transfer" for setting whether or not to transfer a received facsimile for each of 1000 origination sources (CSI/RTI), "transmission facsimile outgoing external line number setting", and "transmission facsimile port setting".

The content of each setting of "origination source (CSI/RTI) transfer" includes "origination source (CSI/RTI)", "mail transfer destination" (to be selected from "mail/group address" and "registered user" of the guest setting information), and "file transfer destination" (to be selected from "file address" of the guest setting information).

Here, max 100 pieces can be registered for "mail transfer destination", and max 4 pieces can be registered for "file transfer destination".

Figure 22B:
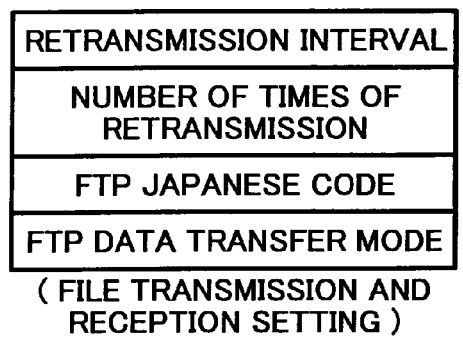
FIG. 22B is a diagram illustrating an example of a file transmission and reception setting.

The facsimile transmission and reception setting includes, for example as illustrated in FIG. 22B, "retransmission interval" for designating the retransmission interval between 60 and 999 seconds, "number of times of retransmission" for designating the number of times of retransmission between 0 and 99 times, "FTP Japanese code" for designating the FTP Japanese code (e.g., shifted JIS code, EUC), and "FTP data transfer mode" for designating the FTP data transfer mode (e.g., the PORT mode, the PASV mode).

The system management includes, for example as illustrated in FIG. 23A, "storage document", "history management", "security", and "date/time setting".

The storage document includes, for example, as illustrated in FIG. 23B, in relation to "automatic deletion setting", "general document" for setting whether or not to perform automatic deletion relative to general documents and designating the time of automatically deleting the general documents between 1 day and 180 days of the storage period when performing automatic deletion, "received mail" for setting whether or not to perform automatic deletion relative to the received mails and designating the time of automatically deleting the received mails between 1 day and 180 days of the storage period when performing automatic deletion, "received facsimile" for setting whether or not to perform automatic deletion relative to the received facsimiles and designating the time of automatically deleting the received facsimiles between 1 day and 180 days of the storage period when performing automatic deletion, "pre-transmission tray" for setting whether or not to perform automatic deletion relative to the pre-transmission mails (the mails before transmission) and for designating the time of deleting the pre-transmission mails between 1 day and 180 days of the storage period when performing automatic deletion, "automatic deletion time" for designating the time of performing automatic deletion between 0:00 and 23:50, and "individual capacity restriction" for setting whether or not to restrict the individual storage capacity and designating the storage capacity between 0.1 GB and 99.9 GB when restricting the individual storage capacity.

The history management includes, for example as illustrated in 23C, "automatic history deletion" for setting whether or not to perform automatic history deletion and designating the time of performing automatic deletion between 0:00 and 23:50 when performing automatic history deletion, "history storage period" for designating the history storage period between 1 day and 180 days, and "automatic management report print" for setting whether or not to perform automatic printing of a management report and designating the time of performing automatic printing between 0:00 and 23:50 when performing automatic printing.

The security includes, for example as illustrated in FIG. 23D, "administrator setting password", "automatic reactivation" for setting whether or not to perform automatic reactivation and designating the time of performing automatic reactivation between 0:00 and 23:50 when performing automatic reactivation, "guest menu prohibition" for setting whether or not to prohibit the guest menu, "new individual registration prohibition" for setting whether or not to prohibit new individual registration, and "address direct input prohibition" for setting whether or not to prohibit direct inputting of an address. The security further includes, with respect to protection of storage document passwords of guests, "general document" for setting whether or not to protect storage document passwords of guests relative to general documents, "received mail" for setting whether or not to protect storage document passwords of guests relative to the received mails, "received facsimile" for setting whether or not to protect storage document passwords of guests relative to the received facsimiles, and "pre-transmission tray" for setting whether or not to protect storage document passwords of guests with respect to the pre-transmission tray. The security further includes, with respect to network access restriction, "HTTP access restriction" for setting whether or not to restrict HTTP access and "SMTP/POP access restriction" for setting whether or not to restrict SMTP/POP access.

Here, protection of storage document passwords of guests is realized by setting such that use of the administrator setting password is required when entering from a screen of the main body of the digital color multi-function apparatus 1 or a Web browser and such that the user name of the Web browser is the identification name of the guest setting.

The date/time setting includes, for example as illustrated in FIG. 23E, "date setting" (2003-2099, January-December, 1-31), and "time setting" (0-23 hour, 0-59 minute, 0-59 second).

In communication in which authentication is desired, for example when the other end in the communication is the digital color multi-function apparatus 1, when a URL for obtaining a file is notified to the digital color multi-function apparatus 1 as link information using email, the digital color multi-function apparatus 1 cannot log on a corresponding FTP server (file server) to obtain the file without the user ID and the password for accessing the FTP server.

For avoiding such a situation that the digital color multi-function apparatus 1 cannot log on an FTP server to obtain a file, the user ID and the password required in accessing the FTP server may be included in link information that is notified to the digital color multi-function apparatus 1 using email, which, however, is not desirable from the viewpoint of security because the link information is transmitted without being encrypted.

Figure 24A:
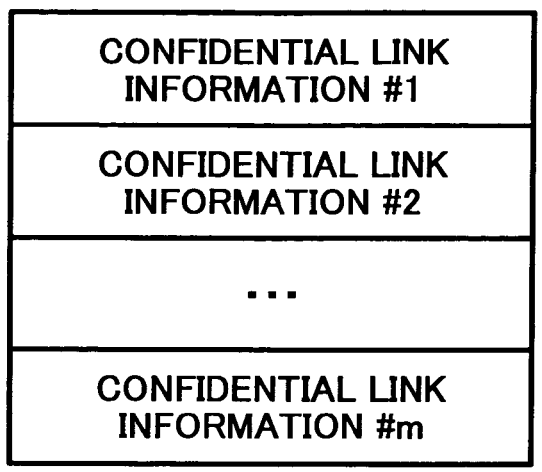
FIG. 24A is a diagram illustrating an example of a confidential link information table.
Figure 24B:
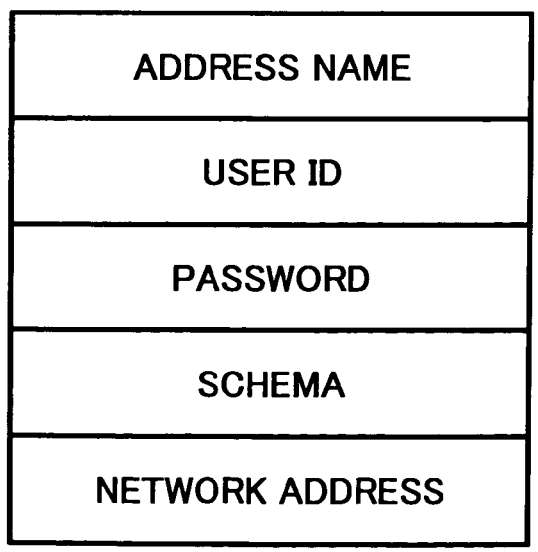
FIG. 24B is a diagram illustrating an example of confidential link information.

Therefore, in this embodiment, a confidential link is adopted. That is, the digital color multi-function apparatus 1 is provided with a confidential link information table storing a plurality of pieces of confidential link information as illustrated in FIG. 24A. Each piece of confidential link information includes, as illustrated in FIG. 24B, "address name", "user ID", "password", "schema", and "network address".

Generally, the apparatuses exchanging confidential link information with each other often are provided with common confidential link information, and the transmitting end designates the confidential link information to be used by including, for example, "network address/file name" in the body of a transmitting email.

In this case, the receiving end can extract the confidential information link by retrieving the confidential link information table using "network address" included in the received email for the keyword. The receiving end then accesses a corresponding FTP server (file server) using "schema" and "network address" registered in the confidential link information table to obtain a file, and when authentication is requested by the FTP server, the authentication can be met using the user ID and the password. Thus, after logging on the FTP server, by retrieving "file name" of the file, the file can be obtained from the FTP server.

In the digital color multi-function apparatus 1 with the above-described configuration, when the user transmits an image of an original document with email, the address, the subject, and the body of an email described in the image of the original document can be extracted using the OCR function to be automatically set in the email.

Here, as described above, the OCR function is executed at the information process unit B, and for example, commercially available application software compatible with the standard OS installed in the information process unit B can be applied.

Figure 25:
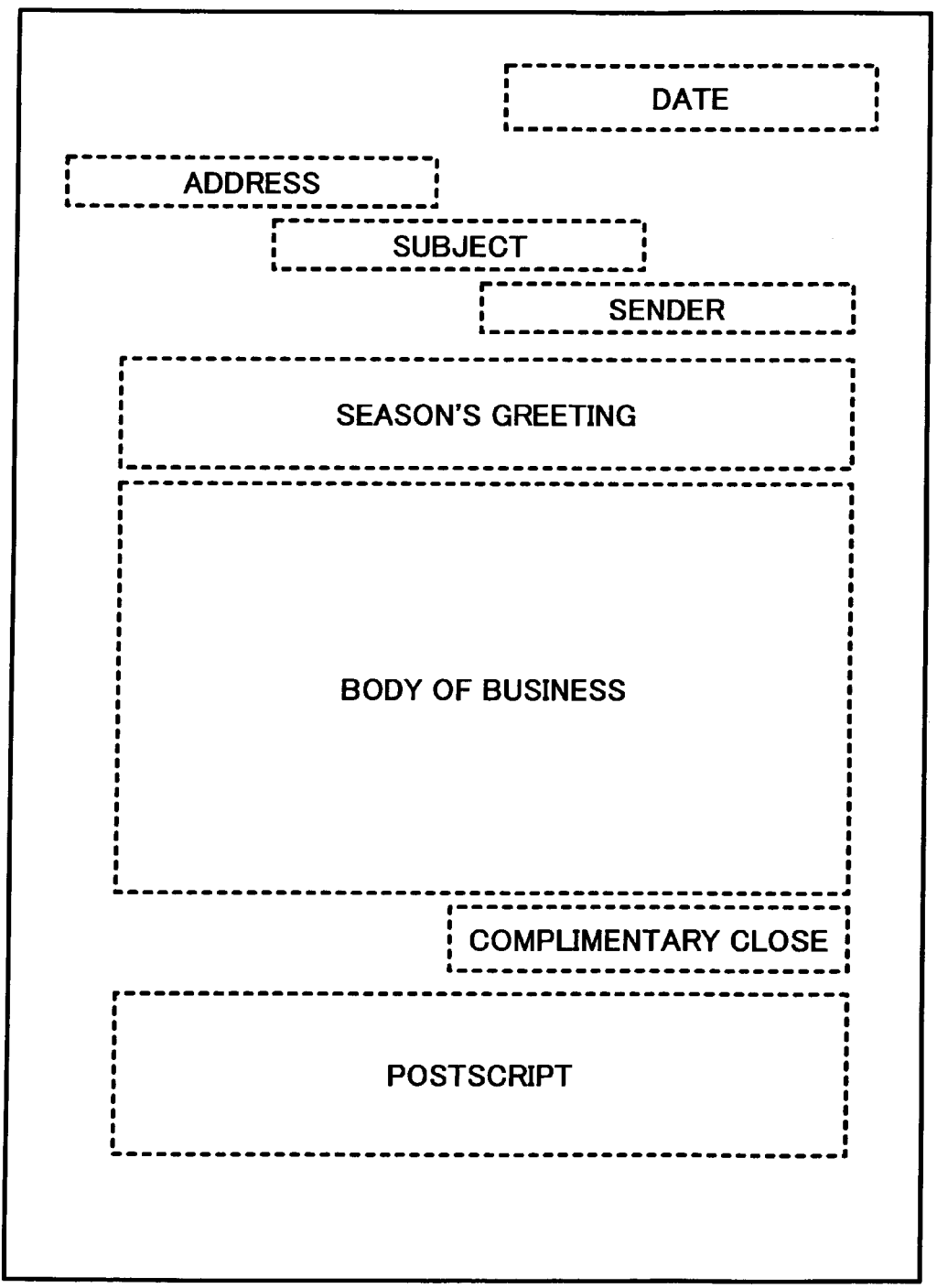
FIG. 25 is a diagram illustrating an example of content arrangement of a business document.

In a typical business document, respective parts constituting the document are arranged as illustrated in FIG. 25.

That is, the date is arranged at the upper right part of the document, the address is arranged below the date and at the left side part of the document, the subject is arranged below the address and at the center part of the document, and the sender is arranged below the subject and at the right side part of the document. Further, the season's greeting is arranged, preceding the body of business, and the complimentary close is arranged below the body of business. Further, the postscript is arranged as necessary below the complimentary close.

Generally, in such a business document, respective contents of the date, the address, the subject, the season's greeting, the body of business, the complimentary close, and the postscript change according to the content of the document; however, the construction and arrangement of respective parts of the document need not change and can be applied as a typical form of business documents.

Accordingly, by extracting image data of the areas of the document where the address, the subject, and the body of business are arranged and by applying optical character recognition to the image data, respective contents of the address, the subject, and the body of business of an email can be automatically generated.

Figure 26A:
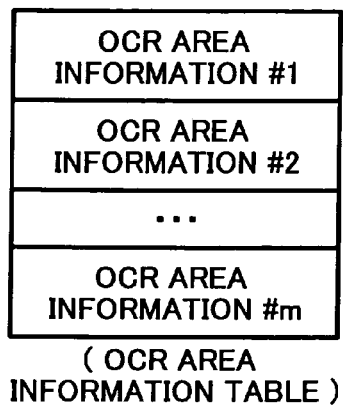
FIG. 26A is a diagram illustrating an example of an OCR area information table.

In this embodiment, an OCR area information table illustrated in FIG. 26A is provided to the information process unit B. The OCR area information table includes, as illustrated in FIG. 26A, a plurality of pieces of OCR areas information defining reading areas of documents of different types #1 to #m, respectively.

Figure 26B:
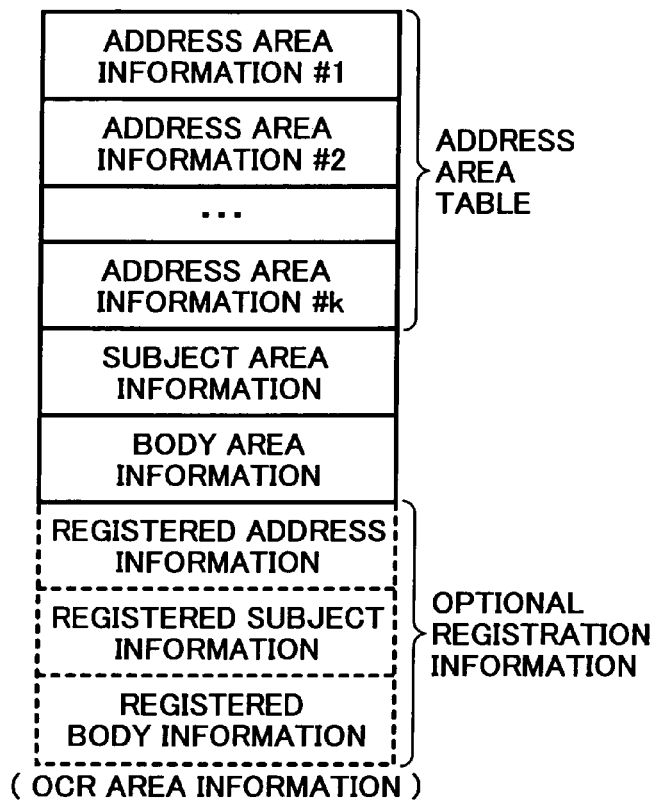
FIG. 26B is a diagram illustrating an example of OCR area information.

Each OCR area information includes, for example as illustrated in FIG. 26B, an address area table including a plurality pieces of address area information #1 to #k, subject area information, body area information, and optional registration information, which is added as necessary, such as registered address information, registered subject information, and registered body information.

Figure 26C:
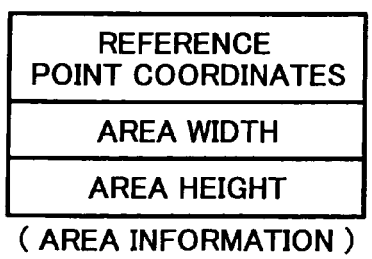
FIG. 26C is a diagram illustrating an example of area information.

Each area information includes, as illustrated in FIG. 26C, "reference point coordinates" expressing the position of the reference point of the area (the upper left corner of the area), "area width" expressing the size of the area in the horizontal direction, and "area height" expressing the size of the area in the vertical direction.

Figure 27:
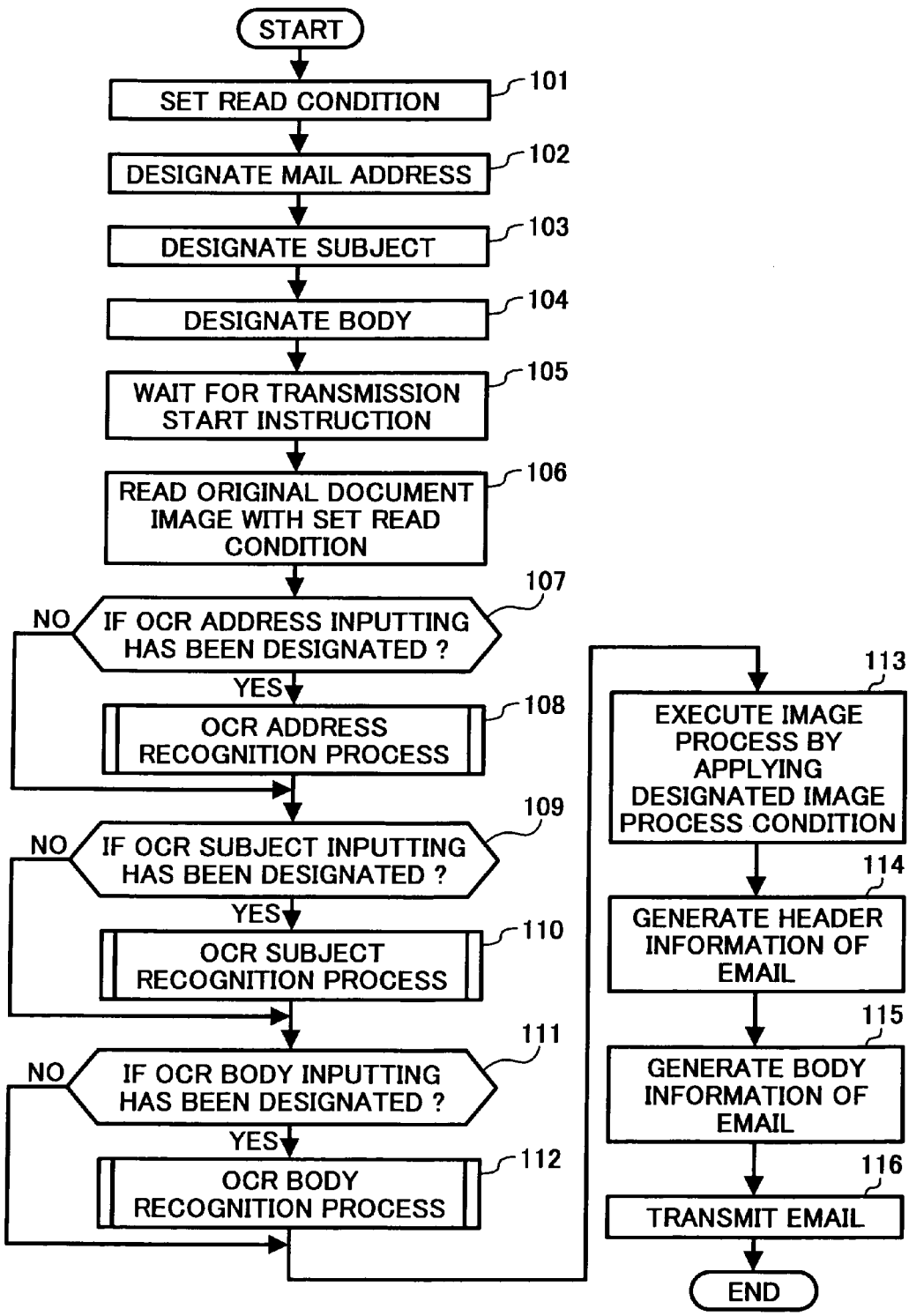
FIG. 27 is a flowchart of an exemplary scan-to-email process of the digital color multi-function apparatus.

FIG. 27 illustrates an exemplary scan-to-email process of the digital color multi-function apparatus 1.

First, after setting a transmitting original document on the image read device 8, the user sets a read condition of reading an image of the original document (101), and designates or inputs a mail address, a subject, and a body of an email (102, 103, 104). At this time, suitable guidance screens are displayed, and the user can designate OCR inputting of the mail address, the subject, and/or the body of the email. After completion of inputting the mail address, the subject, and the body, the operation waits until the user instructs to start transmitting the email (105). When the user has instructed to start transmitting the email, the image of the transmitting original document is read with the designated read condition and thereby image data of the image of the transmitting original document is obtained (106).

Then, it is checked whether or not OCR address inputting has been designated in inputting the address (107). When OCR address inputting has been designated (Yes in 107), an OCR address recognition process of obtaining an address based on designated OCR area information is performed (108). When OCR address inputting has not been designated (No in 107), the OCR address recognition process is not performed.

Further, it is checked whether or not OCR subject inputting has been designated in inputting the subject (109). When OCR subject inputting has been designated (Yes in 109), an OCR subject recognition process of obtaining a subject based on designated OCR area information is performed (110). When OCR subject inputting has not been designated (No in 109), the OCR subject recognition process is not performed.

Furthermore, it is checked whether or not OCR body inputting has been designated in inputting the body (111). When OCR body inputting has been designated (Yes in 111), an OCR body recognition process of obtaining a body based on designated OCR area information is performed (112).

When an image process condition has been designated at this time, an image process is executed relative to the image data obtained in step 106 by applying the designated image process condition (113).

Then, header information of the email is generated using the address and the subject that have been obtained (114), and body information of the email is generated using the body that has been obtained and the image data that has been generated in step 113 (115). Generally, the image data is embedded in the body information as an attached file.

The email is then transmitted (116), and the process ends.

Figure 28:
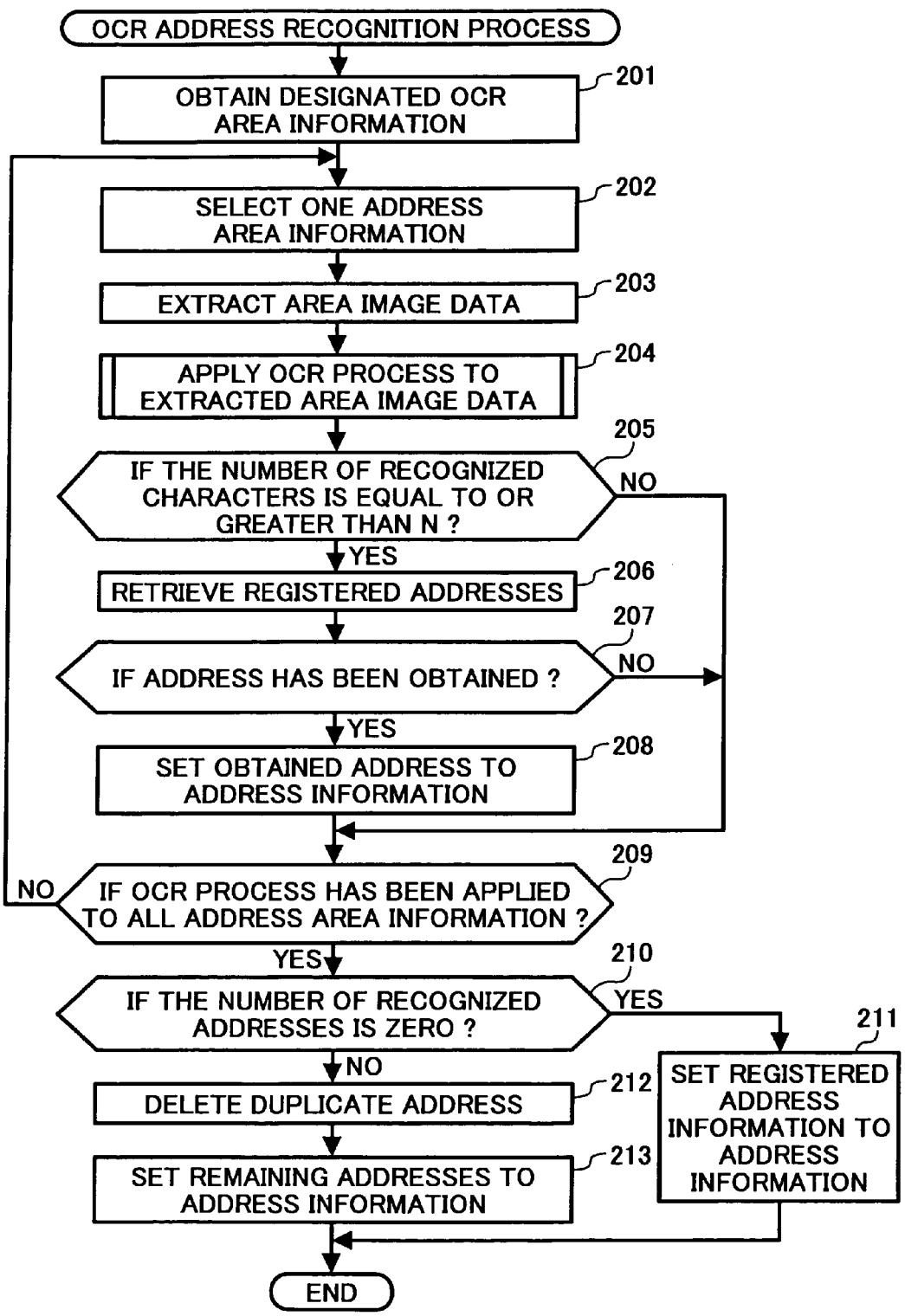
FIG. 28 is a flowchart of an exemplary OCR address recognition process.

FIG. 28 illustrates an example of the OCR address recognition process of step 108.

First, designated OCR area information is obtained (201), one address area information is selected from the address area table of the designated OCR area information (202), an area of the image data obtained by reading the image of the original document is cut off according to the selected address area information and thereby area image data is extracted (203), and a predetermined OCR process is applied to the extracted area image data to obtain a character string (204).

It is then checked whether or not the number of characters recognized by the OCR process (the number of characters in the character string) is equal to or greater than N (for example, N is 8) (step 205), and when the number of characters is equal to or greater than N (Yes in step 205), mail addresses, file addresses, and group addresses registered in association with the user at that time are retrieved by the character string (206).

It is then checked whether or not an address agreeing with the character string has been obtained (207), and when an address agreeing with the character string has been obtained (Yes in step 207), the obtained address is set to address information (208).

Further, it is checked whether or not the OCR process has been applied to all address area information of the address area table of the designated OCR area information (209), and when the OCR process has not been applied to all address area information of the address area table of the designated OCR area information (No in step 209), the process returns to step 202 and the steps 202 through 208 are repeated for the other address area information of the address area table. When the number of characters is not equal to or greater than N (No in step 205) or when an address agreeing with the character string has not been obtained (No in step 207), the process proceeds to step 209.

When the OCR process has been applied to all address area information of the address area table of the designated OCR area information (Yes in step 209), it is checked whether or not the number of addresses obtained by retrieving is zero (210), and when the number of obtained addresses is zero (Yes in step 210), the content of address information registered to the designated OCR area information is set to address information (211), and the process ends. At this time, when no address information is registered to the designated OCR area information, a mail address among mail addresses registered in association with the user, to which OCR address designation has been set, is set to address information. Here, when no address information is registered to the designated OCR area information and no mail address, to which OCR address designation has been set, exists in the mail addresses registered in association with the user, the operation of scan-to-email has failed.

When the number of obtained addresses is not zero (No in step 210), each duplicate address is deleted from the obtained addresses (212), remaining addresses are set to address information (213), and the process ends.

Figure 29:
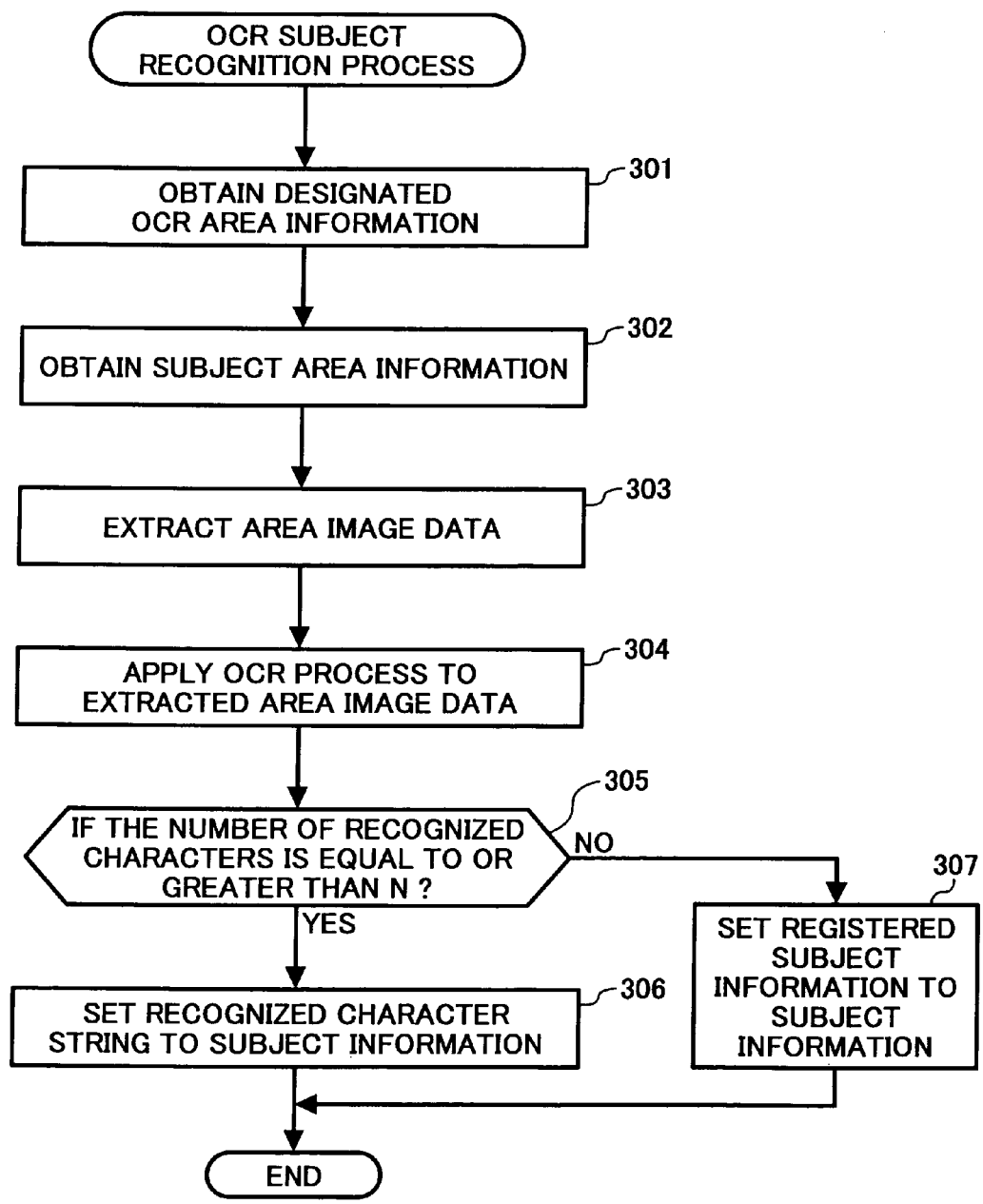
FIG. 29 is a flowchart of an exemplary OCR subject recognition process.

FIG. 29 illustrates an example of the OCR subject recognition process of step 110.

First, designated OCR area information is obtained (301), subject area information is obtained (302), an area of the image data obtained by reading the image of the original document is cut off according to the obtained subject area information and thereby area image data is extracted (303), and the predetermined OCR process is applied to the extracted area image data to obtain a character string (304).

It is checked whether or not the number of characters in the character string is equal to or greater than N (N is, for example, 1) (305), and when the number of characters is equal to or greater than N (Yes in step 305), the character string obtained in step 304 is set to subject information (306).

When the number of characters is not equal to or greater than N (No in step 305), the content of subject information registered to the designated OCR area information at that time is set to subject information (307), and the process ends. At this time, when no subject information is registered to the designated OCR area information, a subject among subjects registered in association with the user, to which OCR subject designation has been set, is set to subject information. Here, when no subject information is registered to the designated OCR area information and when no subject, to which OCR subject designation has been set, exists in the subjects registered in association with the user, the content of the subject is set to be blank.

Figure 30:
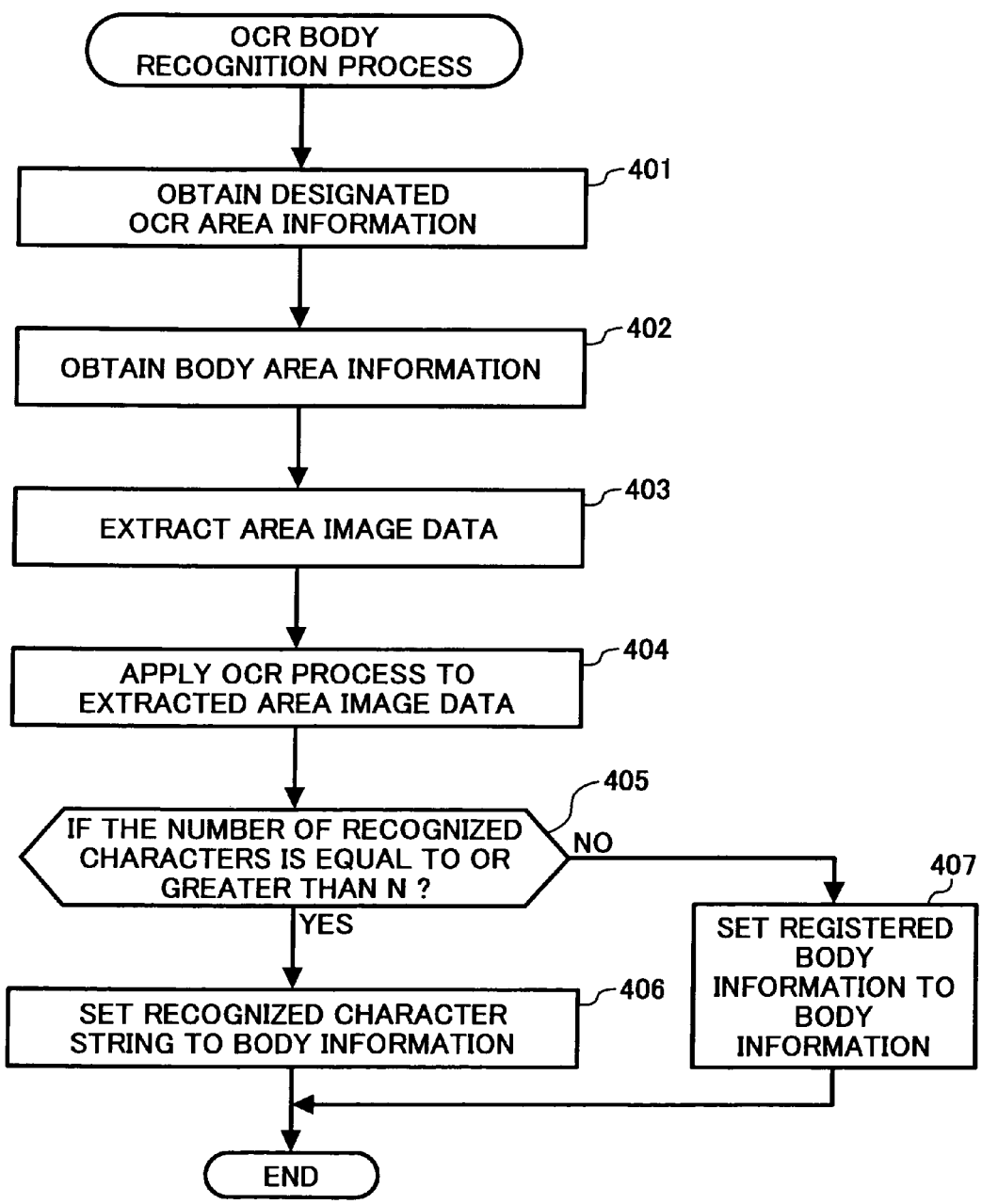
FIG. 30 is a flowchart of an exemplary OCR body recognition process.

FIG. 30 illustrates an example of the OCR body recognition process of step 112.

First, designated OCR area information is obtained (401), body area information is obtained (402), an area of the image data obtained by reading the image of the original document is cut off according to the obtained body area information and thereby area image data is extracted (403), and the predetermined OCR process is applied to the extracted area image data to obtain a character string (404).

It is checked whether or not the number of characters in the character string is equal to or greater than N (N is, for example, 1) (405), and when the number of characters is equal to or greater than N (Yes in step 405), the character string obtained in step 404 is set to body information (406).

When the number of characters is not equal to or greater than N (No in step 405), the content of body information registered to the designated OCR area information at that time is set to body information (407), and the process ends. When no body information is registered to the designated OCR area information, the content of the subject is set to be blank.

Thus, according to the above-described embodiment, when the user uses the scan-to-email function in the digital color multi-function apparatus 1, by designating OCR inputting in inputting an address, a subject, and a body of an email, the labor of inputting or selecting the address, the subject, and the body can be saved, which is convenient.

Numerous additional modifications and variations of the present invention are possible in light of the above-teachings. It is therefore to be understood that within the scope of the claims, the present invention can be practiced otherwise than as specifically described herein.

The invention claimed is:

1. A scan-to-email method of transmitting image data of an original document with email in a multi-function image forming apparatus connected with a network, the method comprising:

storing a plurality of pieces of OCR area information defining OCR areas of original documents of different types, each OCR area information including address area information defining an address area where an address is described, and body area information defining a body area where a body is described;

reading an image of the original document with an image read device of the multi-function image forming apparatus to obtain the image data of the original document, extracting image data of an address area of the original document from the image data of the original document according to the designated one of the plurality of pieces of OCR area information;

performing character recognition to the extracted image data of an address area of the original document to obtain a character string of the address area of the original document;

setting the obtained character string as address information of the email;

extracting image data of a body area of the original document from the image data of the original document according to the designated one of the plurality of pieces of OCR area information;

performing character recognition to the extracted image data of a body area of the original document to obtain a character string of the body area of the original document;

setting the obtained character string as body information of the email;

transmitting the email; and registering body information to each of the plurality pieces of OCR area information;

wherein whether or not a number of characters in the obtained character string of the body area of the original document is equal to or greater than a third predetermined number is determined, and when the number of characters in the obtained character string of the body area of the original document is equal to or greater than the third predetermined number, the obtained character string of the body area of the original document is set as the body information of the email, and when the number of characters in the obtained character string of the body area of the original document is not equal to or greater than the third predetermined number, the body information registered to the designated one of the plurality of pieces of OCR area information is set as the body information of the email.

2. A computer readable medium storing computer program instructions which when executed by a computer perform a scan-to-email operation of transmitting image data of an original document with email in a multi-function image forming apparatus connected with a network, the method comprising:

storing a plurality of pieces of OCR area information defining OCR areas of original documents of different types, each OCR area information including address area information defining an address area where an address is described, and body area information defining a body area where a body is described;

reading an image of the original document with an image read device of the multi-function image forming apparatus to obtain the image data of the original document, extracting image data of an address area of the original document from the image data of the original document according to the designated one of the plurality of pieces of OCR area information;

performing character recognition to the extracted image data of an address area of the original document to obtain a character string of the address area of the original document;

setting the obtained character string as address information of the email;

extracting image data of a body area of the original document from the image data of the original document according to the designated one of the plurality of pieces of OCR area information;

performing character recognition to the extracted image data of a body area of the original document to obtain a character string of the body area of the original document;

setting the obtained character string as body information of the email;

transmitting the email; and registering body information to each of the plurality pieces of OCR area information;

wherein whether or not a number of characters in the obtained character string of the body area of the original document is equal to or greater than a third predetermined number is determined, and when the number of characters in the obtained character string of the body area of the original document is equal to or greater than the third predetermined number, the obtained character string of the body area of the original document is set as the body information of the email, and when the number of characters in the obtained character string of the body area of the original document is not equal to or greater than the third predetermined number, the body information registered to the designated one of the plurality of pieces of OCR area information is set as the body information of the email.

3. A multi-function image forming apparatus connected with a network, comprising:

an image read device configured to read an image of an original document to obtain image data of the original document;

an OCR device configured to recognize characters included in the original document based on the obtained image data of the original document;

an OCR area information storage device configured to store a plurality of pieces of OCR area information defining OCR areas of original documents of different types, each OCR area information including address area information defining an address area where an address is described, and body area information defining a body area where a body is described; and an email transmission device configured to:
  extract image data of an address area of the original document from the image data of the original document according to the designated one of the plurality of pieces of OCR area information,
  perform character recognition to the extracted image data of the address area of the original document to obtain a character string of the address area of the original document;
  set the obtained character string as address information of the email;
  extract image data of a body area of the original document from the image data of the original document according to the designated one of the plurality of pieces of OCR area information;
  perform character recognition to the extracted image data of the body area of the original document to obtain a character string of the body area of the original document; and
  set the obtained character string as body information of the email;

a registration device configured to register body information to each of the plurality of pieces of OCR area information;

a transmission device configured to transmit the email; and a computer readable medium including computer executable instructions to:

determine whether or not a number of characters in the obtained character string of the body area of the original document is equal to or greater than a third predetermined number, and to set when the number of characters in the obtained character string of the body area of the original document is equal to or greater than the third predetermined number, the obtained character string of the body area of the original document as the body information of the email, and to set when the number of characters in the obtained character string of the body area of the original document is not equal to or greater than the third predetermined number, the body information registered to the designated one of the plurality of pieces of OCR area information as the body information of the email.

* * * * *